(12) United States Patent
Wakabayashi et al.

(10) Patent No.: US 6,687,361 B1
(45) Date of Patent: Feb. 3, 2004

(54) ELECTRONIC EXCHANGE AND KEY TELEPHONE SYSTEM

(75) Inventors: Tamotsu Wakabayashi, Tokyo (JP); Masashi Ishida, Hino (JP); Katsunori Utsumi, Hino (JP); Nobuhiro Masaki, Kodaira (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 707 days.

(21) Appl. No.: 09/642,942

(22) Filed: Aug. 22, 2000

(30) Foreign Application Priority Data

Aug. 23, 1999 (JP) .......................................... 11-235008
Aug. 15, 2000 (JP) ....................................... 2000-246319

(51) Int. Cl.[7] .............................................. H04M 3/42
(52) U.S. Cl. .............................. 379/211.02; 379/212.01; 379/88.12
(58) Field of Search ..................... 379/211.02, 212.01, 379/225, 88.12

(56) References Cited

U.S. PATENT DOCUMENTS 5,579,383 A * 11/1996 Bales et al. ............ 379/211.02
6,363,142 B1 * 3/2002 Stumer .................. 379/211.01

FOREIGN PATENT DOCUMENTS

| FI | WO 01/10141 A1 | 8/2001 | ............ H04Q/3/62 |
|---|---|---|---|
| JP | 60-141063 | 7/1985 | |
| JP | 63-87065 | 4/1988 | |
| JP | 11-103350 | 4/1990 | |
| JP | 5-68100 | 3/1993 | |
| JP | 6-188998 | 7/1994 | |
| JP | 07-203502 | 8/1995 | |
| JP | 8-293924 | 11/1996 | |

* cited by examiner

*Primary Examiner*—Jack Chiang
*Assistant Examiner*—Rasha S AL Aubaidi
(74) *Attorney, Agent, or Firm*—Finnegan, Henderson, Farabow, Garrett & Dunner, L.L.P.

(57) ABSTRACT

The present invention provides an electronic exchange capable of certainly making forwarding to a telephone at the forwarding destination. When an electronic exchange receives a forwarding acknowledgement signal "Facility message" from an electronic exchange, if a telephone to be called is idle, the electronic exchange makes the telephone shift to the receiving standby state for the forwarding, turns on an extension button of the telephone and sets the call transmission and the call reception except for the forwarding to be impossible.

21 Claims, 22 Drawing Sheets

|  | 8 | 7 | 6 | 5 | 4 | 3 | 2 | 1 |  |
|---|---|---|---|---|---|---|---|---|---|
| OCTET 1 | 0 | 1 | 1 | 0 | 1 | 1 | 0 | 0 | CALLER NUMBER INFORMATION ELEMENT IDENTIFIER |
| OCTET 2 | | | | | | | | | CALLER NUMBER CONTENTS LENGTH |
| OCTET 3 | 0/1 EXTENDED | NUMBER TYPE | | | NUMBER PLAN IDENTIFICATION | | | | |
| OCTET 4 | 1 EXTENDED | DISPLAY IDENTIFIER | | 0 0 RESERVED | | | NETWORK VERIFICATION IDENTIFIER | | |
| OCTET 5 | 0 RESERVED | NUMBER DIGIT | | | | | | | |
| | | 3 | | | | | | | ⎫ CALLER TELEPHONE NUMBER (3000) |
| | | 0 | | | | | | | |
| | | 0 | | | | | | | |
| | | 0 | | | | | | | ⎭ |
| | | 1 | | | | | | | ⎫ CALLING RESTRICTION CLASS NUMBER (11) |
| | | 1 | | | | | | | ⎭ |

FIG. 16

ELECTRONIC EXCHANGE AND KEY TELEPHONE SYSTEM

CROSS-REFERENCE TO RELATED APPLICATIONS

This application is based upon and claims the benefit of priority from the prior Japanese Patent Applications No. 11-235008, filed Aug. 23, 1999; and No. 2000-246319, filed Aug. 15, 2000, the entire contents of which are incorporated herein by reference.

BACKGROUND OF THE INVENTION

The present invention relates to an electronic exchange and a key telephone system.

An electronic exchange has been capable of controlling call reception from and call transmission to other electronic exchanges by employing the QSIG protocol defined by the European Computer Manufacturers Association, which is the international standard for digital lines.

The services can be provided by constructing the networking by use of this kind of electronic exchanges as if one single electronic exchange were operated for the user using the electronic exchanges.

FIG. 1 is a view showing a networking using conventional electronic exchanges. FIG. 2 is a view showing a sequence of a message signal forwarded between the electronic exchanges in the networking of FIG. 1.

In FIG. 1 electronic exchanges 10, 11 and 12 are respectively connected to one another in digital lines 21, 22 and 23 employing the QSIG protocol.

It is assumed now that telephones 1 and 2 communicate with one another via the electronic exchanges 10 and 11, and the telephone 2 forwards the call with the telephone 1 to a telephone 3 connected to the electronic exchange 12 so that the telephones 1 and 3 communicate with one another.

When the user of the telephone 2 executes hooking operation to the electronic exchange 11, a dial tone signal is transmitted from the electronic exchange 11 to the telephone 2. At the same time, the telephone 1 of the communication partner is made to be in the on-hold state by the electronic exchange 11.

The user of the telephone 2 dials a telephone number of the telephone 3 as the forwarding destination by the telephone 2 after having confirmed the dial tone.

The electronic exchange 11 transmits a forward acknowledgement signal "Facility message" defined by the QSIG protocol to a digital line 22, in response to the dialing. At this time, specific information about the telephone number of the call destination, a person who forwards this message, a person who receives the forwarded message, etc., i.e. facility information elements are added to the Facility message.

Receiving the "Facility message" from the electronic exchange 11, the electronic exchange 12 checks whether the telephone 3 is idle or not. If the telephone 3 is idle, the electronic exchange 12 transmits to the electronic exchange 11 a "Call proceeding message", which indicates that the forwarding is acceptable.

On the other hand, the telephone 2 is in the on-hook state and remains idle after the dialing.

Receiving the "Call proceeding message" from the electronic exchange 12, the electronic exchange 11 recognizes that the telephone 3, which is a destination of a call to be forwarded to the electronic exchange 10, is idle and can accept the call. At this time, the electronic exchange 11 inserts the information about the forwarding into the "Facility message" and transmits the message to the electronic exchange 10 so that the electronic exchange transmits a calling request "Setup message" as a formal call start request to the electronic exchange 12.

The electronic exchange 10 transmits the "Setup message" to the electronic exchange 12 in accordance with the information included in the "Facility message".

Receiving the "Setup message", the electronic exchange 12 checks again whether the telephone 3 is idle or not. If the telephone 3 is idle, the electronic exchange 12 transmits the "Call proceeding message", which represents the acknowledgement of acceptance for the call, to the electronic exchange 10. At the same time, the electronic exchange 12 transmits a calling signal to the telephone 3 and transmits "Alerting", which represents a state of extension calling, to electronic exchange 10.

Incidentally, with the conventional electric exchanges, in a case where a calling operation is executed at the telephone 3 or a call from the other telephones is received at the telephone 3 after the electronic exchange 12 has received the "Facility message" and transmitted the "Call proceeding message" representing that the forwarding is acceptable, when there is an incoming call from the electronic exchange 10, the telephone 3 is busy and thus the forwarding is not accomplished, as shown in a flow chart of FIG. 3. In this case, there is also a drawback that the data traffic unnecessarily increases since an invalid signal is transmitted within the network.

Calling restriction as to whether a call from extension telephones should be accepted is often executed in accordance with international, longdistance and local destinations of calling. In this case, with the conventional electronic exchanges, the information unique to the manufacturer, common to only electronic exchanges of the same manufacturer is inserted into the manufacturer information element of the QSIG protocol, and is provided to electronic exchanges connected to the public telephone network by those connected to extension telephones.

Transmission of the manufacturer information element needs to be executed under the dedicated coding rules, and software for transmission and reception is also required. For this reason, the load on the CPU (central processing unit) in the electronic exchange may increase, technical problems may arise, and circuitry may be complicated due to the addition of new hardware.

FIG. 4 is a block diagram showing a configuration of a conventional key telephone system adapted to U point of an ISDN line.

A key telephone system 50 includes an ISDN interface unit (I/F unit) 51 for connecting with an ISDN network 60 and an ISDN terminal 70, and a control unit 52 for controlling the ISDN interface unit 51 and executing the calling process and the speech exchange process.

The ISDN interface unit 51 and the control unit 52 exchange various signals such as speech data, a clock signal, a frame synchronization signal, a control signal, etc. via an internal bus 53.

FIG. 5 is a block diagram showing the structures of the ISDN interface unit 51 and the control unit 52.

The ISDN interface unit 51 includes an interface LSI 80 for interfacing (called NT) with the ISDN network 60, and an interface LSI 81 for interfacing (called LT) with the ISDN terminal 70. The interface LSI 80 is fixed to the NT mode that allows the operation to be made in accordance with a clock signal extracted from the ISDN network 60. The interface LSI 81 is fixed to the LT mode that makes the terminal synchronous by using its own clock signal. A port corresponding to the NT mode is called a line port and a port corresponding to the LT mode is called an extension port.

When the interface LSI 80 is set to extract clock signal CLK from the ISDN network 60, i.e. when the interface LSI 80 is set in the NT mode, a switch unit 82 is turned on and a switch unit 84 is turned off. The interface LSI 80 extracts the clock signal CLK from the ISDN network 60 and outputs the signal through its own clock port.

The clock signal CLK that is output from the interface LSI 80 is input to a timing generation unit 85 of the control unit 52 as basic clock signal CLKb through the switch unit 82.

The timing generation unit 85 generates system clock signal CLKs in accordance with the basic clock signal CLKb and supplies this signal to both a time switch unit 86 of the control unit 52 and a phase adjustment time switch unit 83 of the ISDN interface unit 51 to make synchronization in the system. The timing generation unit 85 also generates a frame synchronization signal FS and outputs the signal to the phase adjustment time switch unit 83 and the time switch unit 86.

Synchronization between the interface LSI 80 and the interface LSI 81 is made by the clock signal CLK that is output from the interface LSI 80 and the frame synchronization signal FS. The speech data of the interface LSI 80 and the interface LSI 81 is transmitted to the phase adjustment time switch unit 83 in a single speech data highway DH1 and further transmitted to the time switch unit 86 in a speech data highway DH2 synchronized with the time switch unit 86.

When the interface LSI 80 is set not to extract the clock signal CLK from the ISDN network 60, i.e. when the interface LSI 80 is set in the LT mode, the switch unit 82 is turned off and the switch unit 84 is turned on. The interface LSI 80 and the interface LSI 81 are made synchronized with the system by the system clock signal CLKs and the frame synchronization signal FS that are generated by the timing generation unit 85 of the control unit 52. At this time, the clock ports of the interfaces LSIs 80 and 81 are set in the input state.

In the case of the conventional key telephone system constituted as described above, the interface LSIS 80 and 81 are fixed to either the NT mode or the LT mode and, therefore, the degree of freedom in the selection of the line is small. For example, if the user requires two interfaces in the NT mode, it is necessary to prepare for another ISDN interface unit 51. For this reason, the circuitry of the system becomes larger and the miniaturization is prevented, and the manufacturing costs are increased.

FIG. 6 is a block diagram showing the configurations of an ISDN interface unit 56 and a control unit 57 in the conventional key telephone system adapted to S and T points of the ISDN line.

The ISDN interface unit 56 includes an interface LSI 120 for interfacing (called TE) with the ISDN network 60 and an interface LSI 121 for interfacing (called NT) with the ISDN terminal 70. The interface LSIs 120 and 121 are fixed to either the TE or the NT.

When the interface LSI 120 is set to extract the clock signal CLK from the ISDN network 60, i.e. when the interface LSI 120 is set in the TE, the interface LSI 120 extracts the clock signal CLK from the ISDN network 60 and outputs the signal through the clock port. The clock signal CLK output from the interface LSI 120 is input to a timing generation unit 123 of the control unit 57.

The timing generation unit 123 generates the system clock signal CLKs in accordance with the clock signal CLK and supplies the signal to the interface LSI 121 that synchronizes with the timing generation unit 123 as a slave at the NT mode. The timing generation unit 123 also generates a frame synchronization signal FS1. The frame synchronization signal FS1 is supplied to a phase adjustment time switch unit 122 together with a frame synchronization signal FS2 output from the interface CSI 120. Speech data DS1 and DS2 of the interface LSIs 120 and 121 is supplied from the phase adjustment time switch unit 122 to the a time switch unit 124 of the control unit 57 in a single speech highway HS.

In the interface LSI 121, the frame synchronization is executed by using the frame synchronization signal FS1 generated by the timing generation unit 123 of the control unit 57, due to the slave-synchronization.

In the case of this conventional key telephone system, like the above-described key telephone system, the interface LSIs 120 and 121 are fixed to either the NT mode or the TE mode and, therefore, the degree of freedom in the selection of the line is small. If the user requires two NT functions, it is necessary to prepare for another ISDN interface unit 56. For this reason, the circuitry of the system becomes larger and the miniaturization is prevented, and the manufacturing costs are increased.

BRIEF SUMMARY OF THE INVENTION

The present invention is accomplished in consideration of such circumstances, and the object thereof is to provide an electronic exchange capable of certainly making forwarding to a telephone at the forwarding destination and a key telephone system with a high degree of freedom in the selection of the line.

To achieve the object, according to the first aspect of the present invention, an electronic exchange capable of controlling call reception from and call transmission to other electronic exchanges is provided. The electronic exchange comprises means for receiving a request for a forwarding from the other electronic exchanges, and prohibiting means for setting a telephone of forwarding destination connected to the own electronic exchange to be in a state of prohibiting the call reception except for the forwarding or the call transmission at the time to make the telephone shift to a standby state for the forwarding in response to the request for the forwarding.

According to the present invention, the telephone of the forwarding destination is shifted from the idle state to the receiving standby state for the forwarding, in response to the request for forwarding from the other electronic exchange, so as to set the call transmission and the call reception except for the forwarding at the telephone to be impossible.

Therefore, even if calling operations are executed at the telephone of the forwarding destination or there is a call from a different telephone, the calling is invalid and thereby the forwarding of the call can be certainly accomplished. Further, the data traffic is not unnecessarily increased since an invalid signal is not transmitted into the network as seen in the prior art It is p referable that the electronic exchange is capable of controlling th e call reception from and call transmission to the other electronic exchanges under the QSIG protocol.

It is preferable that when the telephone of forwarding destination connected to the own electronic exchange is idle after receiving a request for the forwarding, the telephone is made to shift to be in a standby state for the forwarding.

It is preferable that the electronic exchange further comprises announcement setting means for setting the telephone so as to announce to a user of the telephone that the telephone is set in the prohibition state.

According to the present invention, it is announced to the user of the telephone that the call reception except for the forwarding and the call transmission are prohibited.

Thus, t he user of the telephone at the forwarding destination can recognize that the forwarding is to be made. Therefore, he can properly make further response without being confused or making a mistake in the operations.

The announcement setting means may set the telephone so as to operate a sound source provided in the telephone, set the telephone so as to display predetermined information on a display unit provided on the telephone, or set the telephone so as to turn on a light of a display unit provided on the telephone.

In addition, the announcement setting means may set the telephone so as to operate a sound source provided in the telephone when a calling key of the telephone is pushed down in a period from the time of shifting to the standby state for the forwarding to the time of receiving an incoming of call caused by the forwarding. The announcement setting means sets the telephone so as to display predetermined information on a display unit provided on the telephone when a calling key of the telephone is pushed down in the period from the time of shifting to the standby state for the forwarding to the time of receiving an incoming of call caused by the forwarding.

Further, the announcement setting means may set the telephone so as to turn on a light of a display unit provided on the telephone when a calling key of the telephone is pushed down in the period from the time of shifting to the standby state for the forwarding to the time of receiving an incoming of call caused by the forwarding. The announcement setting means may also set the telephone so as not to accept input made by a dial key when a calling key of the telephone is pushed down in the period from the time of shifting to the standby state for the forwarding to the time of receiving an incoming of call caused by the forwarding.

According to another aspect of the present invention, an electronic exchange capable of controlling call reception from and call transmission to other electronic exchanges is provided. The electronic exchange comprises means for receiving a request for a forwarding from the other electronic exchanges, and announcement setting means for setting a telephone of forwarding destination connected to the own electronic exchange to announce to a user of the telephone that the telephone is set in a standby state for the forwarding at the time to make the telephone shift to the standby state for the forwarding in response to the request for the forwarding.

According to the present invention, it is announced to the user of the telephone in response to the request for forwarding that the forwarding destination is in the incoming standby state. The user of the telephone at the forwarding destination can thereby recognize that the forwarding is to be made and, therefore, he can properly make further response without being confused or making a mistake in the operations.

According to the other aspect of the present invention, an electronic exchange for connecting calling from a telephone connected to other electronic exchange to an outside line connected to the own electronic exchange, under the QSIG protocol that is an international standard of digital lines. The electric exchange comprises means for receiving information to restrict the calling from the other electronic exchange at the time of the calling from the telephone; and means for restricting the calling from the telephone to the outside line in response to the calling restriction information. The calling restriction information is added to a caller number notification information element of the QSIG protocol.

According to the present invention, the calling restriction information can be transmitted technically easily at low costs without using a specific information element, by adding the calling restriction information to the caller number notification information element of the QSIG protocol.

It is preferable that the electronic exchange further comprises a table for storing calling restriction contents and the calling restricting means searches for the calling restriction contents on the table in response to the calling restriction information and restricts the calling in accordance with the searched calling restriction contents.

According to the other aspect of the present invention, a key telephone system is provided. The key telephone system comprises interface means having a line interface function of transmitting digital data to an ISDN network via a U point of an ISDN line and an extension interface function of transmitting digital data to an ISDN terminal, for selectively setting one of the functions; and control means for setting the interface means to implement one of the line interface function and the extension interface function in accordance with line setting information.

According to the present invention, one interface means can be freely set to implement the line interface function or the extension interface function.

Therefore, it is possible to implement a key telephone system with a high degree of freedom, in which the number of the ISDN line ports and that of extension ports can be increased or decreased in accordance with the application.

According to the other aspect of the present invention, a key telephone system is provided. The key telephone system comprises interface means having a line interface function of transmitting digital data to an ISDN network via a U point of an ISDN line and an extension interface function of transmitting digital data to an ISDN terminal, for selectively setting one of the functions; timing generating means for generating a system clock signal and a frame synchronization signal in accordance with a clock signal output from the interface means when the interface means is set to implement the line interface function, and for generating the system clock signal and the frame synchronization signal in accordance with an internal clock signal when the interface means is set to implement the extension interface function; first switch means interposed into a signal transmission path between a clock signal input/output terminal of the interface means and a clock signal input/output terminal of the timing generating means; second switch means interposed into a signal transmission path between a system clock signal output terminal and a frame synchronization signal output terminal of the timing generating means, and a clock signal input/output terminal and a frame synchronization signal input/output terminal of the interface means; and control means for setting the interface means to implement one of the line interface function and the extension interface function in accordance with line setting information, for turning on the first switch means and turning off the second switch means when the interface means is set to implement the line interface function, and for turning off the first switch means and turning on the second switch means when the interface means is set to implement the extension interface function.

According to the present invention at the U point of the ISDN line, the line interface function and the extension interface function of the interface means are set by the control means. When the interface means is set to implement the extension interface function, the first switch means is turned off and the second switch means is turned on by the control means to use the internal clock signal of the timing generating means. The control means sets the line interface function and the extension interface function of the interface means in accordance with the line setting information.

Thus, the interface means can be freely set to implement either the line interface function or the extension interface function.

Therefore, it is possible to implement a key telephone system with a high degree of freedom, in which the number of the ISDN line ports and that of extension ports can be preferably increased or decreased.

According to the other aspect of the present invention, a key telephone system is provided. The key telephone system comprises interface means having a line interface function of transmitting digital data to an ISDN network via S and T points of an ISDN line and an extension interface function of transmitting digital data to an ISDN terminal, for selectively setting one of the functions; first switch means connected to the interface means, for changing a transmission line and a reception line respectively at the time of setting the line interface function and at the time of setting the extension interface function; second switch means interposed into signal transmission paths of a clock signal and a frame synchronization signal to the interface means, for changing input/output of the clock signal and the frame synchronization signal to the interface means; and control means for setting the interface means to implement one of the line interface function and the extension interface function in accordance with the line setting information, for changing the second switch means to the side of outputting the clock signal and the frame synchronization signal when the interface means is set to implement the line interface function, and for changing the second switch means to the side of inputting the clock signal and the frame synchronization signal when the interface means is set to implement the extension interface function.

According to the present invention, the first switch means for reversing the transmission line and the reception line is provided in front of the interface means so that the transmission line and the reception line are changed at the S and T points of the ISDN line. The control means also sets to implement the line interface function and the extension interface function of the interface means, and controls the changing of the second switch means.

When the first switch means is changed to the line interface function side, the line setting information to be set to implement the line interface function is input to the control means. On the other hand, when the second switch means is changed to the extension interface function side, the line setting information to be set to implement the extension interface function is input to the control means.

After inputting the line setting information to be set at the line interface function, the control means sets the interface means to implement the line interface function and changes the second switch means to the side of outputting the clock signal and the frame synchronization signal.

When the control means is input the line setting information to be set at the extension interface function, the control means sets the interface means to implement the extension interface function and changes the second switch means to the side of inputting the clock signal and the frame synchronization signal.

Therefore, the interface means can be freely set to implement either the line interface function or the extension interface function. For this reason, a key telephone system with a high degree of freedom can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 16 is a diagram showing calling number information under the QSIG protocol;

DETAILED DESCRIPTION OF THE INVENTION

Embodiments of the present invention will be explained below in detail with reference to the drawings.

(I) Electronic Exchange (a) First Embodiment

Figure 1:
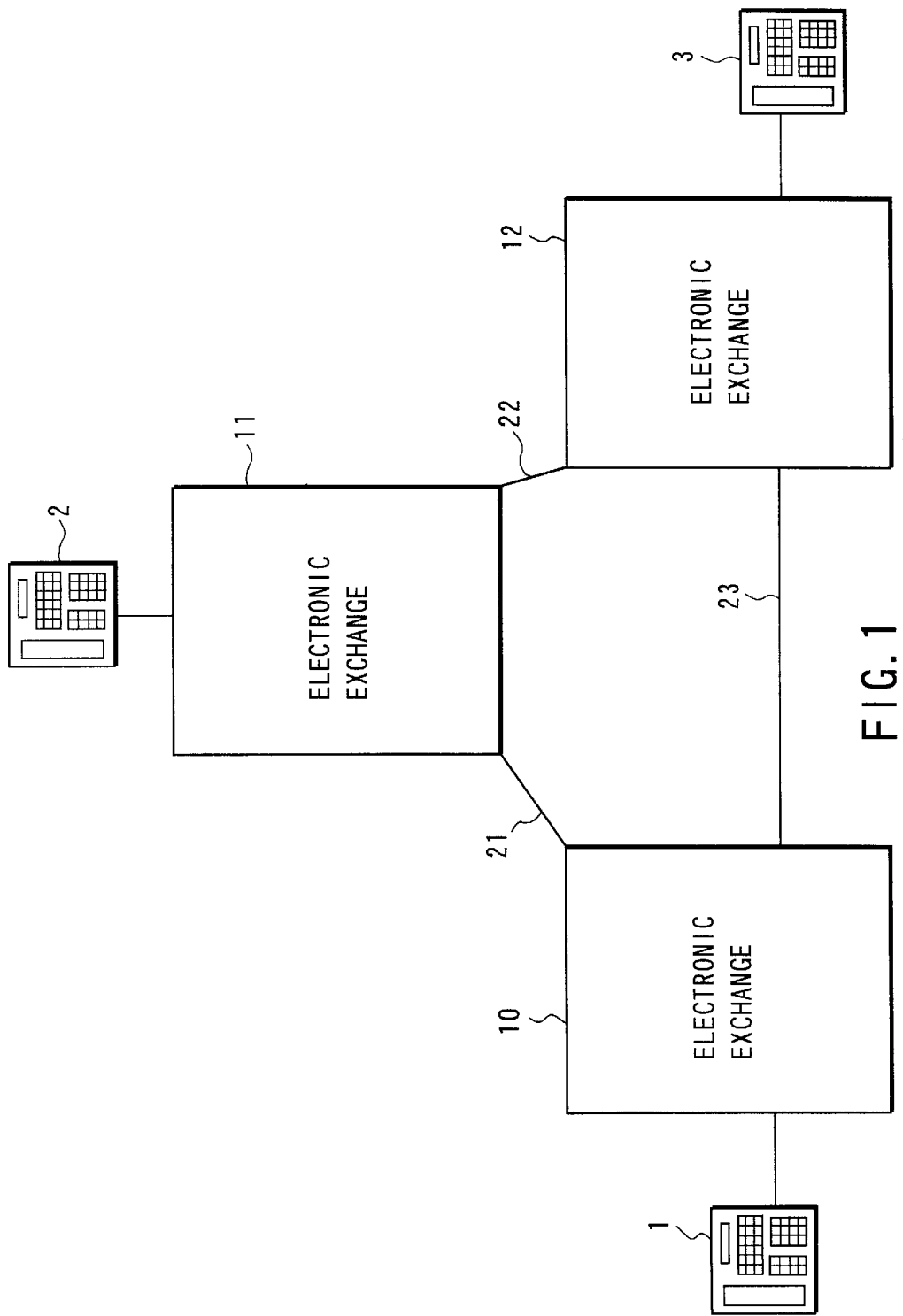
FIG. 1 is a diagram showing networking of conventional electronic telephones.
Figure 2:
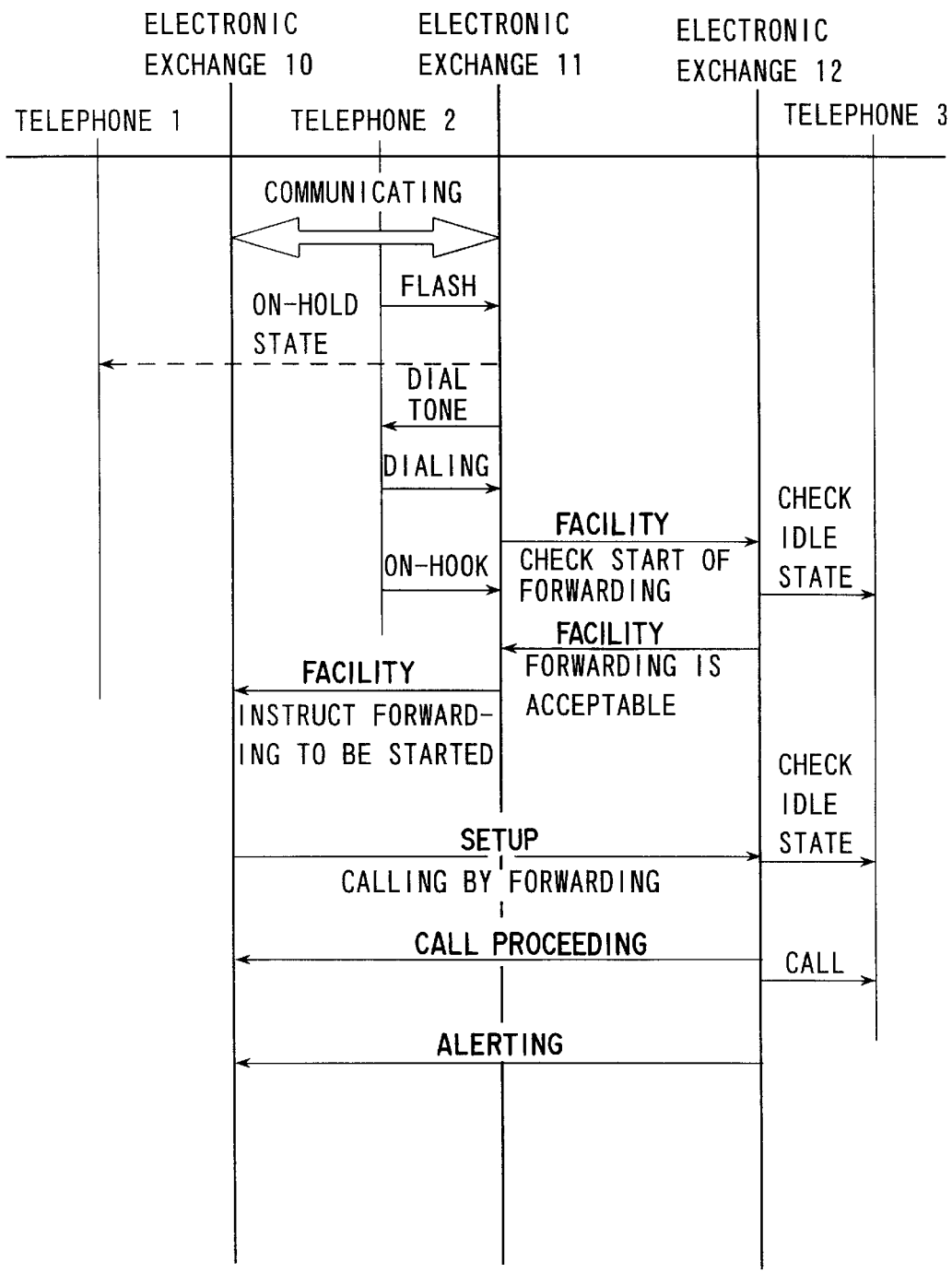
FIG. 2 is a diagram showing exchange of message signals at the forwarding among the electronic exchanges in the networking of FIG. 1.
Figure 3:
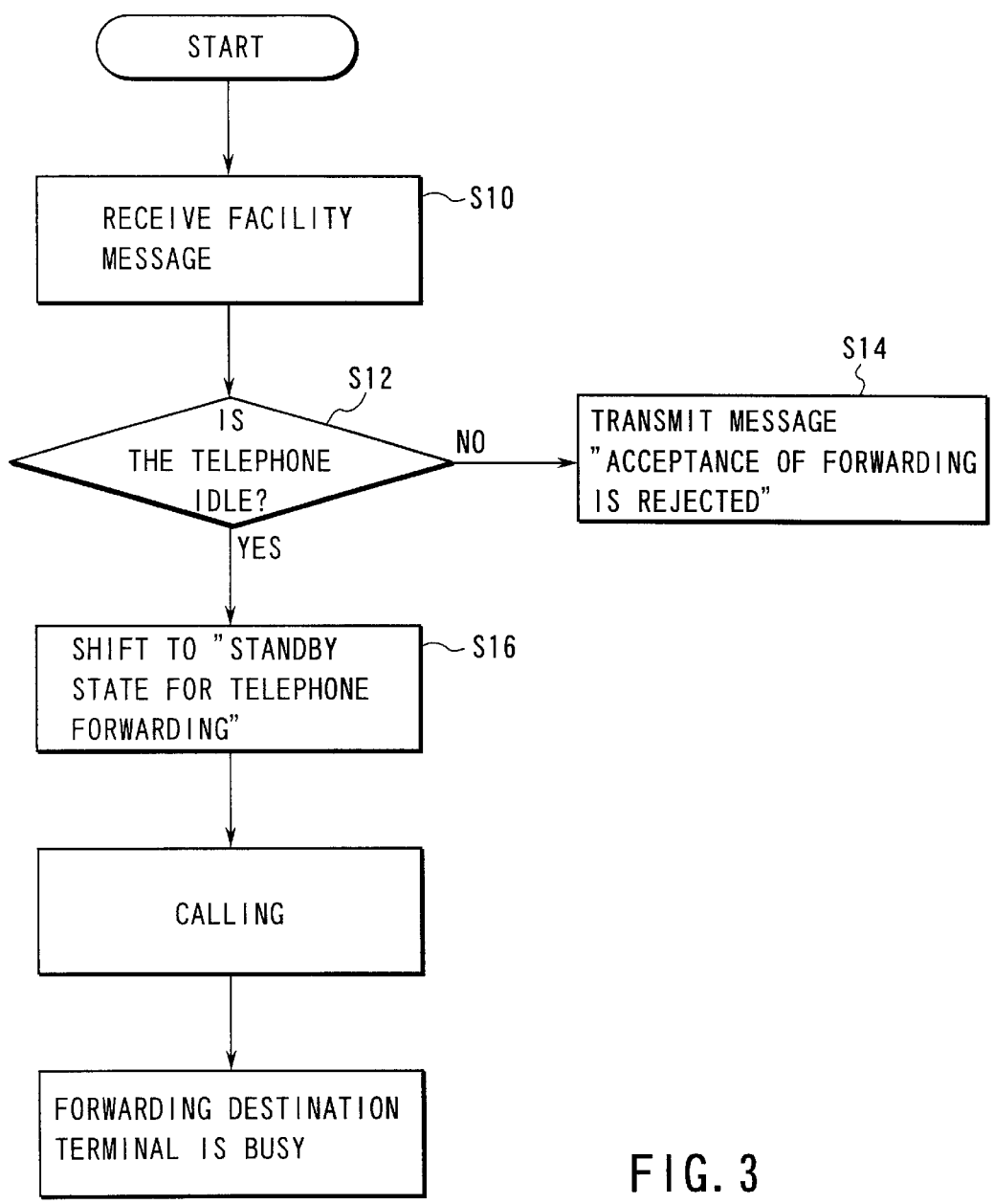
FIG. 3 is a flow chart showing the operations of the electronic exchanges in the networking of FIG. 1.
Figure 4:
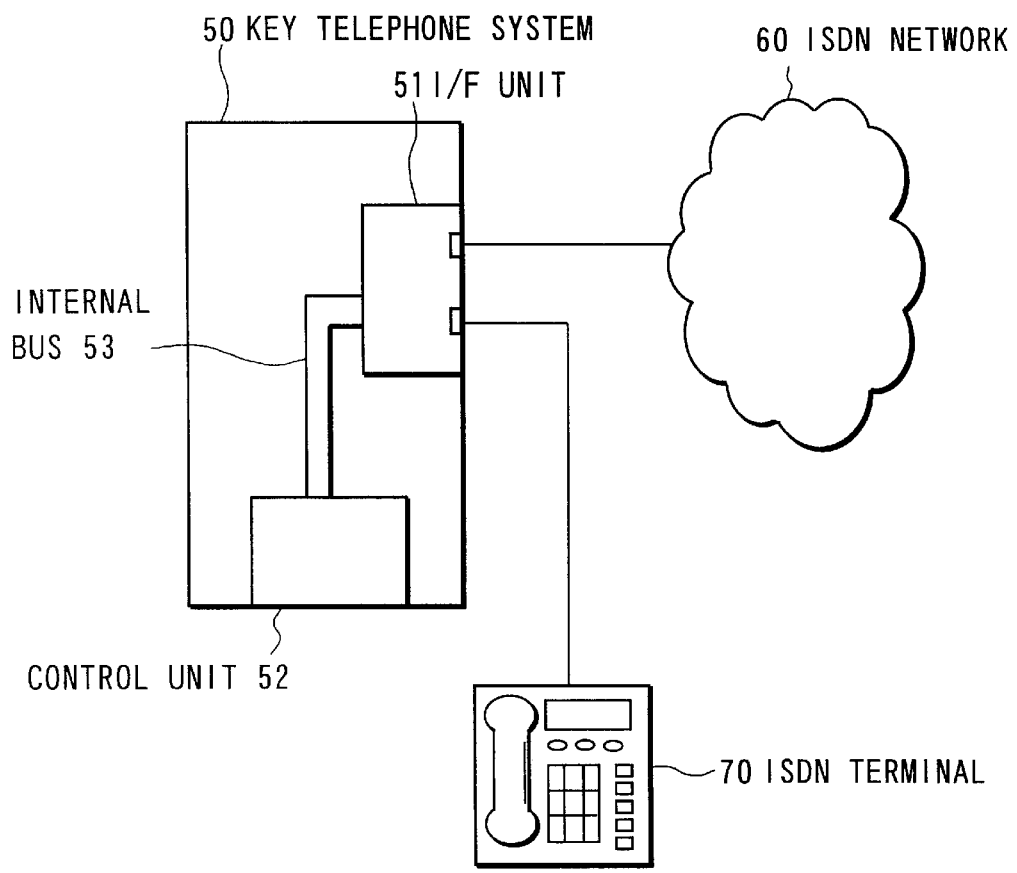
FIG. 4 is a block diagram showing a configuration of a conventional key telephone system.
Figure 7:
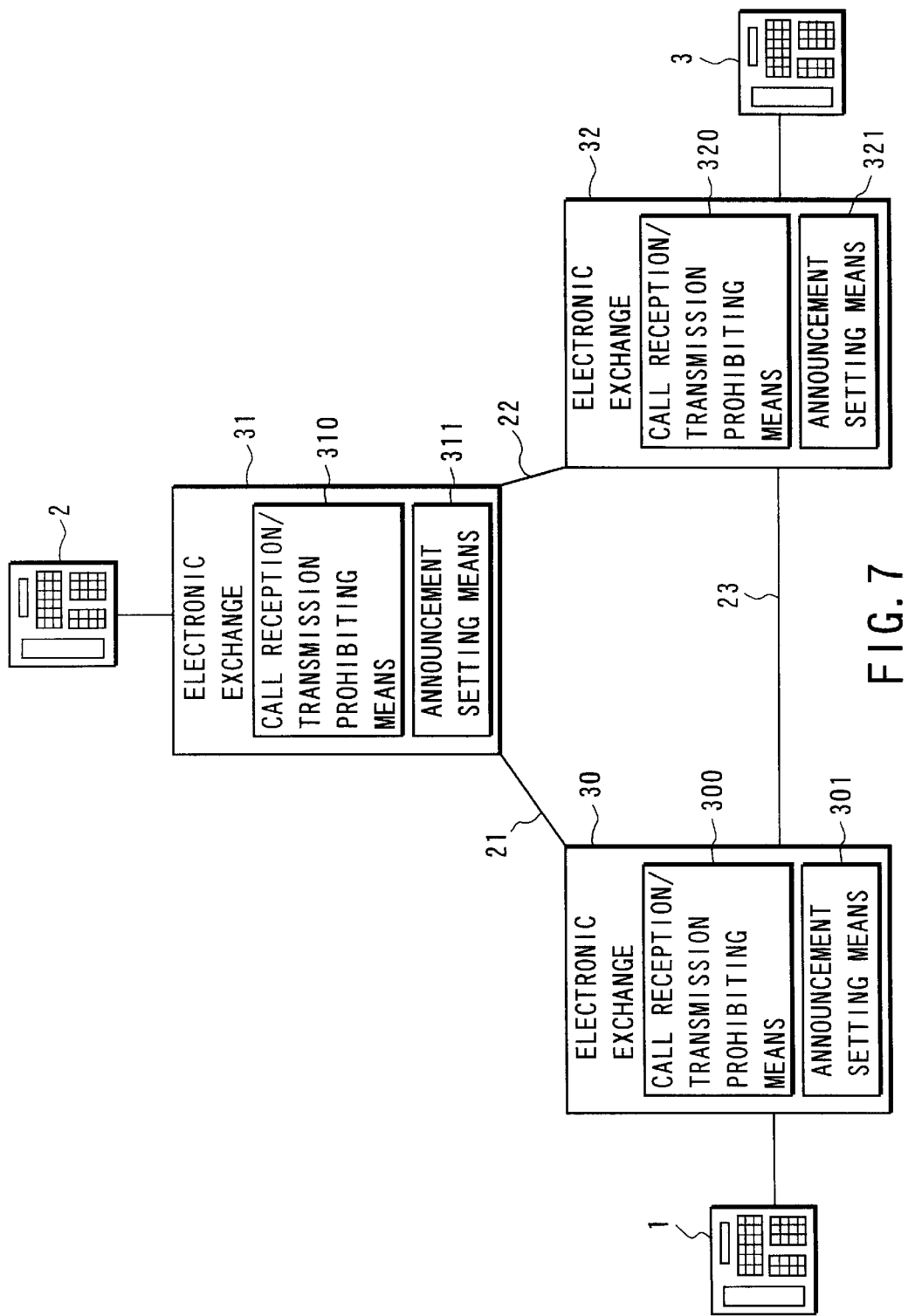
FIG. 7 is a block diagram showing an electronic exchange according to a first embodiment of the present invention.
Figure 8:
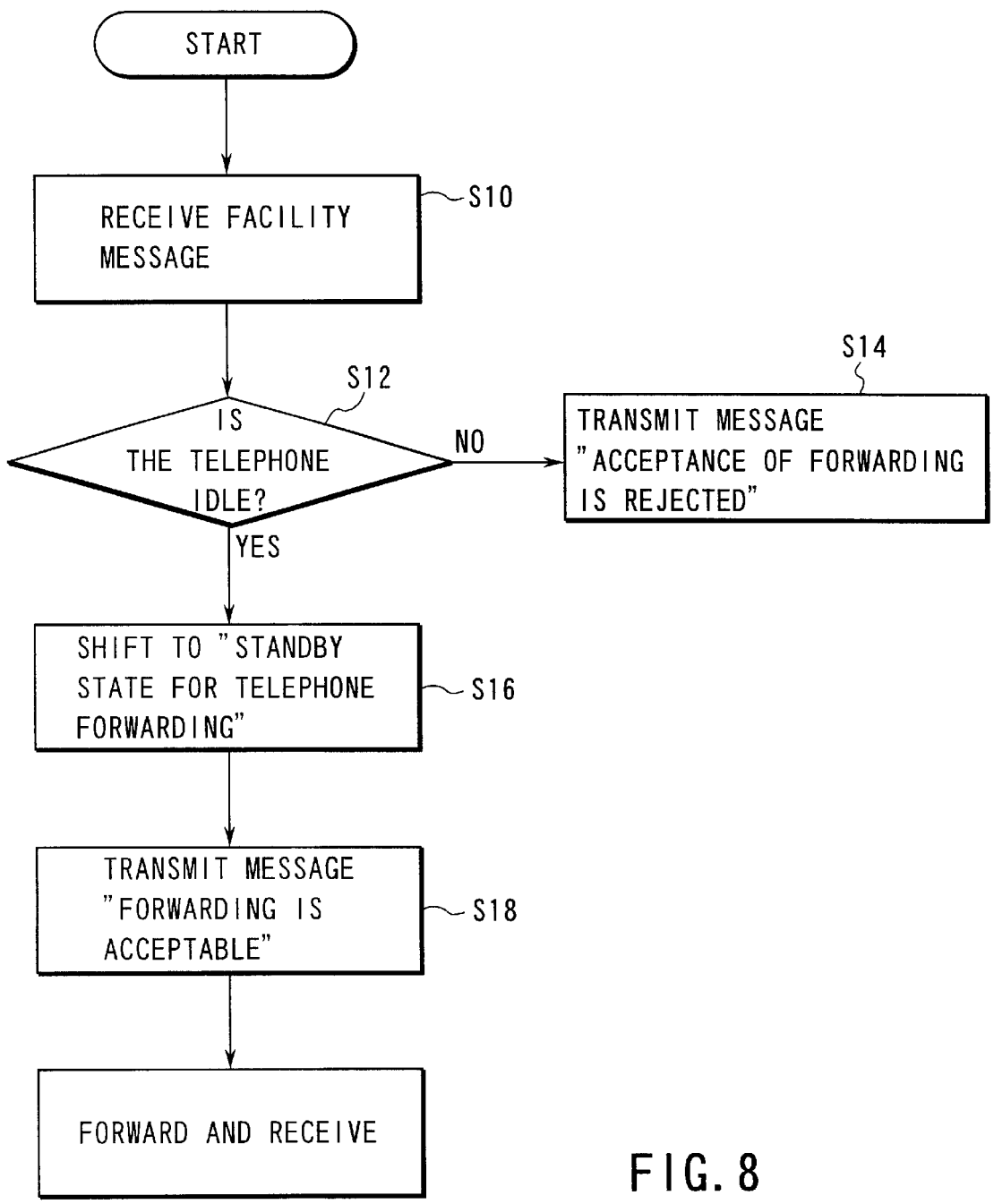
FIG. 8 is a flow chart showing the operations of the electronic exchange according to the first embodiment.

FIG. 7 is a diagram showing the networking of electronic exchanges according to the first embodiment of the present invention. FIG. 8 is a flow chart showing the process after the electronic exchanges of the first embodiment have received "Facility message". In FIG. 7 the same portions as those of FIG. 1 are denoted by the same reference numerals.

In FIG. 7, electronic exchanges 30, 31 and 32 comprising call reception/transmission prohibiting means 300, 310 and 320, and announcement setting means 301, 311 and 321 are connected to one another in digital lines 21, 22 and 23 employing the QSIG protocol, which is the international standard of the digital dedicated lines.

It is assured now that the telephone 1 has communication with the telephone 2 via the electronic exchanges 30 and 31 and the telephone 2 forwards the call with the telephone 1 to the telephone 3 connected to the electronic exchange 32 so as to allow the telephones 1 and 3 to make communication.

FIG. 8 is a flow chart showing the operations of the electronic exchanges according to the first embodiment of the present invention.

In this figure, when the electronic exchange 32 receives forward acknowledgement signal "Facility message" from the electronic exchange 31 (S10), the electronic exchange 32 checks whether the telephone 3 to be called is idle or not (S12). If the telephone 3 is not idle, the electronic exchange 32 transmits a message to the electronic exchange 31 indicating a rejection of forwarding acceptance (S14). On the other hand, if the telephone 3 is idle, the electronic exchange 32 makes the telephone 3 shift to the receiving standby state for the forwarding (S16). The announcement setting means 321 turns on an extension button in the telephone 3. The call reception/transmission prohibiting means 320 sets the call transmission and the call reception except for the forwarding to be impossible.

After having set the call transmission and the call reception except for the forwarding to be impossible for the telephone 3, the electronic exchange 32 transmits "Call proceeding message" representing that the forwarding is acceptable to the electronic exchange 31 (S18).

When the electronic exchange 31 receives the "Call proceeding message" from the electronic exchange 32, the electronic exchange 31 recognizes that the telephone 3, which is the destination of a call to be forwarded, is idle and can accept the call. At this time, the electronic exchange 31 transmits the information about the forwarding included in the "Facility message" to the electronic exchange 30 so that the electronic exchange 30 transmits the calling request "Setup message" as a formal call start request to the electronic exchange 32.

Receiving the "Facility message" transmitted from the electronic exchange 31, the electronic exchange 30 transmits the calling request "Setup message" to the electronic exchange 32 in accordance with the information included in the Facility message.

When the electronic exchange 32 receives the "Setup message", the electronic exchange 32 checks again whether the telephone 3 is idle or not. If the telephone 3 is idle, the electronic exchange 32 transmits the "Call proceeding message" as the acknowledgement of acceptance for the call to the electronic exchange 30. The electronic exchange 32 further transmits the calling signal to the telephone 3 and transmits "Alerting" representing that electronic exchange 32 is calling an extension to the electronic exchange 30.

When the user of the telephone 3 hooks off the telephone 3 after hearing the ringing tone, he can make communication with the telephone 1.

In the first embodiment, the telephone 32 receives the forwarding acknowledgement signal "Facility message" from the electronic exchange 31, and if the telephone 3 to be called is idle, the telephone 32 makes the telephone 3 shift to the receiving standby state for the forwarding, turns on the extension button of the telephone 3 and sets the call transmission and the call reception except for the forwarding to be impossible.

Thus, even if the calling operations are executed at the telephone 3 or if there is the call reception from a different telephone until the call reception from the electronic exchange 30, they are invalid by setting the call transmission and the call reception except for the forwarding to be impossible for the telephone 3. For this reason, the forwarding of the incoming call from the electronic exchange 30 can be certainly achieved. Further, no invalid signals are transmitted into the network as seen in the prior art and, therefore, the data traffic is not increased unnecessarily.

(b) Second Embodiment

Figure 9:
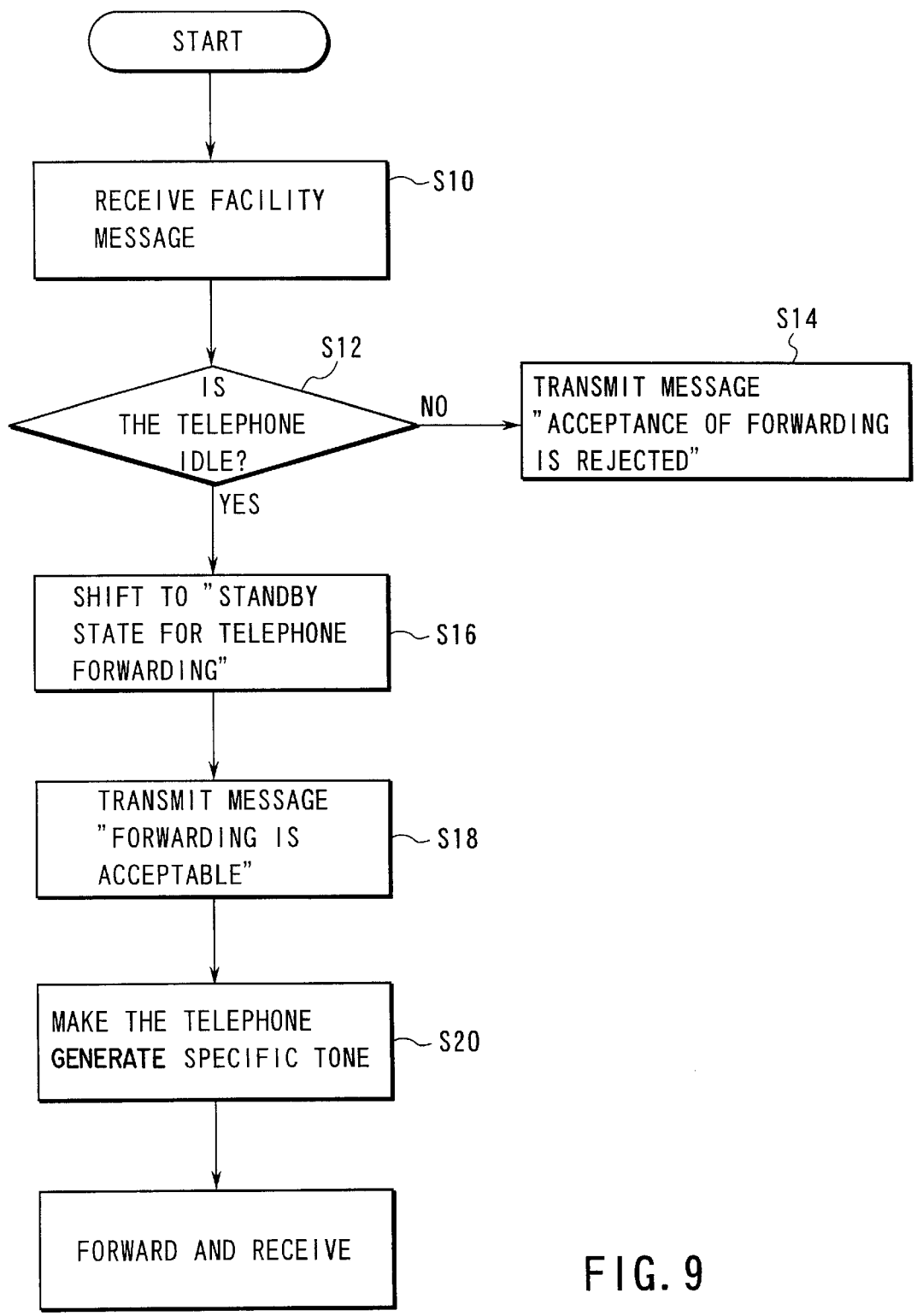
FIG. 9 is a block diagram showing the operation of an electronic exchange according to a second embodiment of the present invention.

FIG. 9 is a flow chart showing the process after the telephone of a second embodiment receives the "Facility message". In this embodiment, the configuration of the digital line network is the same as that of FIG. 7.

An announcement function (S20) is added to this embodiment in which the announcement setting means 321 in the electronic exchange 32 causes the telephone 3 of the forwarding destination output a specific tone to announce to the user of the telephone 3 that the call transmission and the call reception except for the forwarding become impossible. The announcement function step (S20) is executed after the step (S18) of making the electronic exchange 32 transmit the "Call proceeding message" to the electronic exchange 31, but may be executed before the step (S18).

The user of the telephone 3 of the forwarding destination is informed that the call transmission and the call reception except for the forwarding become impossible. He can therefore recognize that the forwarding is to be executed and properly make a further response without being confused or making a mistake in the operations.

(c) Third Embodiment

Figure 10:
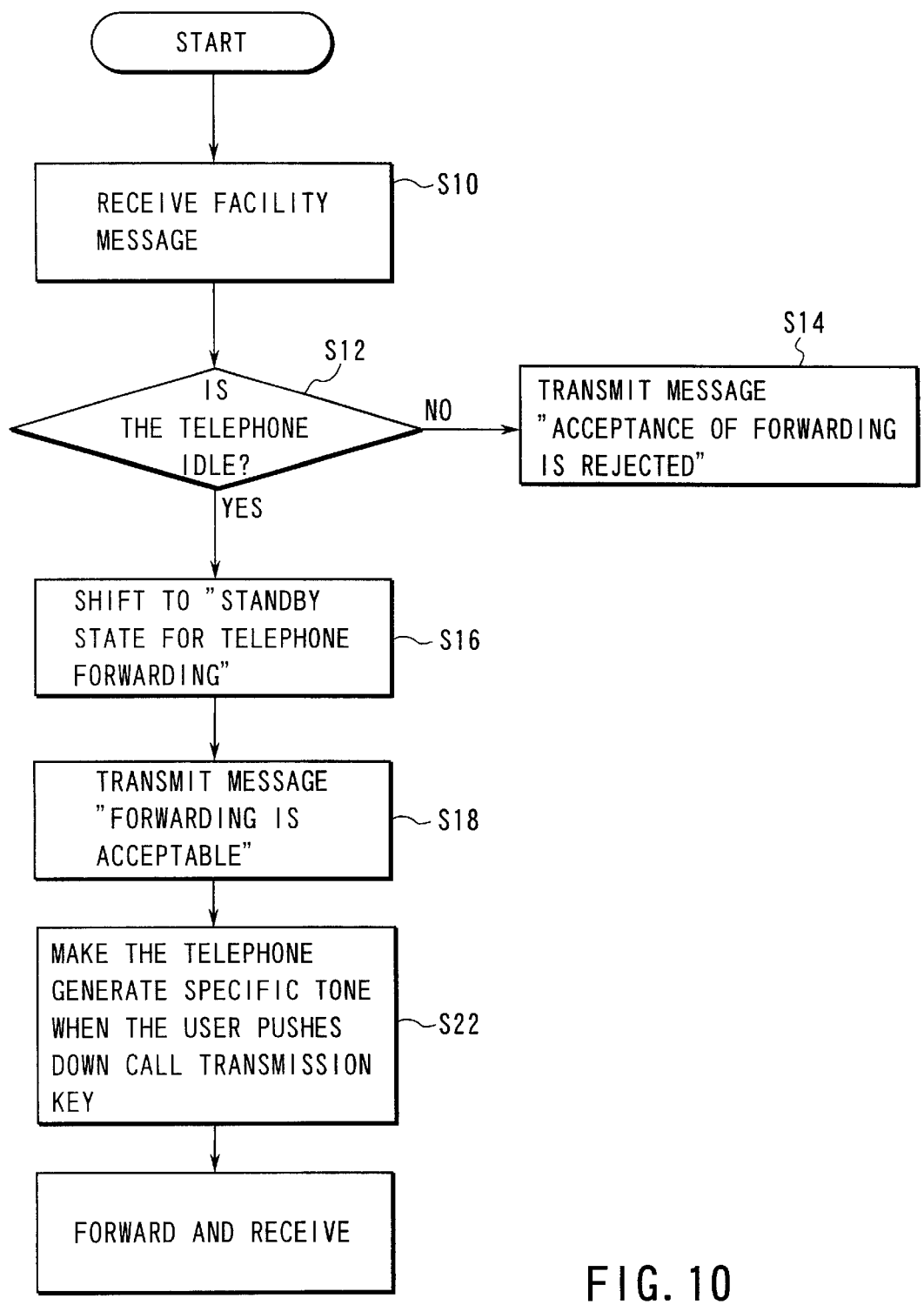
FIG. 10 is a block diagram showing the operation of an electronic exchange according to a third embodiment of the present invention.

FIG. 10 is a flow chart showing the process after the telephone of a third embodiment receives the "Facility message". In this embodiment, the configuration of the digital line network is the same as that of FIG. 7.

An announcement function (S22) is added to this embodiment in which the announcement setting means 321 in the electronic exchange 32 causes the telephone 3 generate a specific tone to announce to the user of the telephone 3 that the call transmission and the call reception except for the forwarding become impossible when the user pushes down a call transmission key of the telephone 3. The announcement function step (S22) is executed after the step (S18) of making the electronic exchange 32 transmit the "Call proceeding message" to the electronic exchange 31, but may be executed before the step (S18).

The user of the telephone 3 of the forwarding destination is informed that the call transmission and the call reception except for the forwarding become impossible. He can therefore recognize that the forwarding is to be executed and properly make a further response without being confused or making a mistake in the operations.

In the third embodiment, when the call transmission key of the telephone 3 is pushed down a specific tone is generated therefrom. However, input from the dial key can be rejected when the call transmission key is pushed shown. In this case, the specific tone can also be simultaneously generated.

(d) Fourth Embodiment

Figure 11:
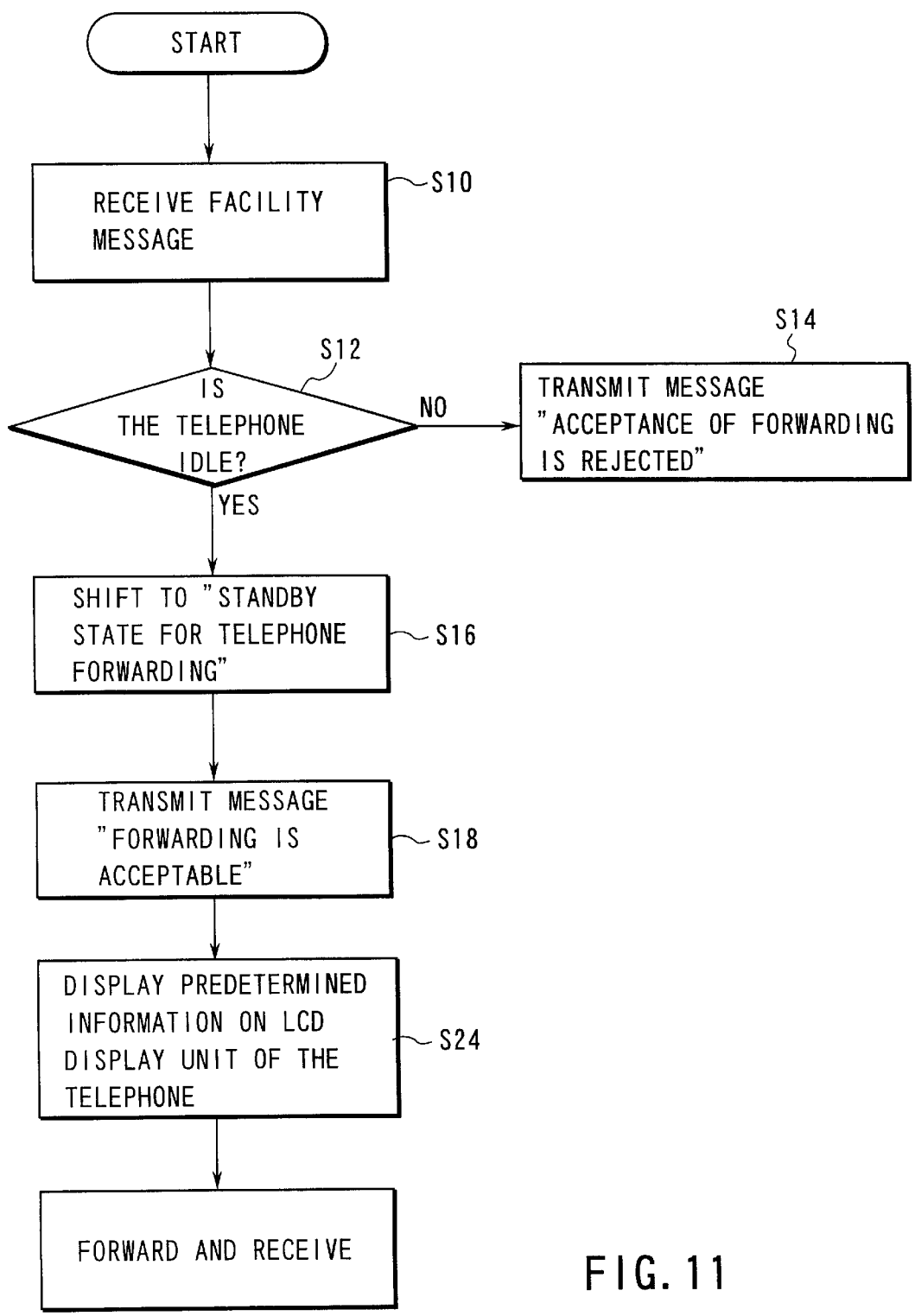
FIG. 11 is a block diagram showing the operation of an electronic exchange according to a fourth embodiment of the present invention.

FIG. 11 is a flow chart showing the process after the telephone of a fourth embodiment receives the "Facility message". In this embodiment, the configuration of the digital line network is the same as that of FIG. 7.

An announcement function (S24) is added to this embodiment in which the announcement setting means 321 in the electronic exchange 32 causes the telephone 3 of the forwarding destination display predetermined information on a display unit such as an LCD of the telephone 3 to announce to the user of the telephone 3 that the call transmission and the call reception except for the forwarding become impossible.

The announcement function step (S24) is executed after the step (S18) of making the electronic exchange 32 transmit the "Call proceeding message" to the electronic exchange 31, but may be executed before the step (S18).

Figure 12:
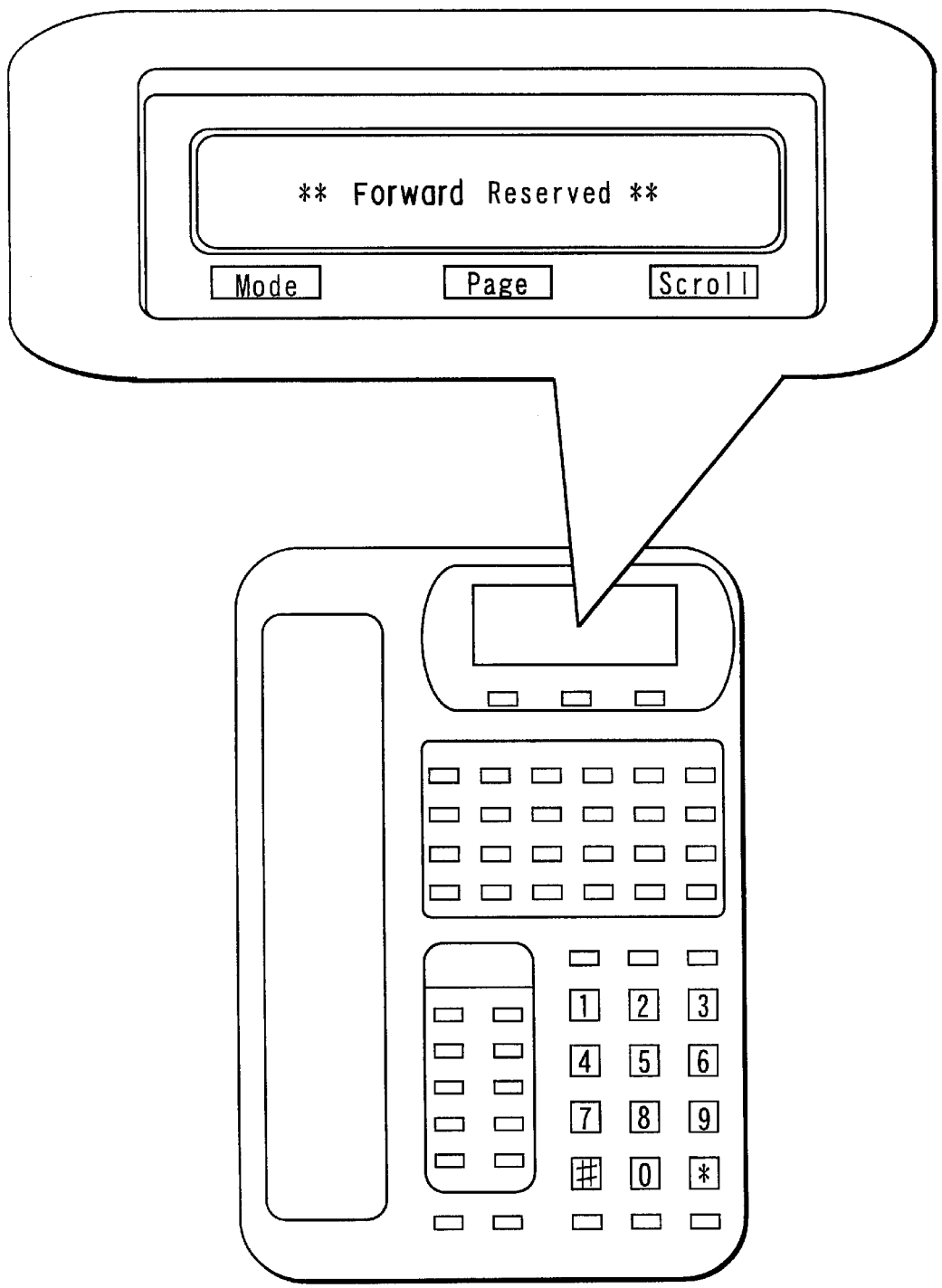
FIG. 12 is a diagram showing an example of displaying information on a telephone by the electronic exchange of the fourth embodiment.

FIG. 12 shows an example of the display on the telephone 3 in a case where it shifts to the standby state for the forwarding. In this example, "Forward Reserved" is displayed.

The user of the telephone 3 of the forwarding destination is informed that the call transmission and the call reception except for the forwarding become impossible. He can therefore recognize that the forwarding is to be executed and properly make a further response without being confused or making a mistake in the operations.

In the fourth embodiment, the predetermined information is displayed on the LCD display unit of the telephone 3 of the forwarding destination when the telephone 3 shifts to the standby state for the forwarding. However, the predetermined information may be displayed on the display unit when the call transmission key of the telephone 3 is pushed down while the telephone 3 shifts to the standby state for the forwarding. In this case, the specific tone may be simultaneously output.

Further, when while the telephone 3 shifts to the standby state for the forwarding, the display unit provided on the telephone 3 may be turned on to inform the user that the telephone 3 is in the standby state for the forwarding.

(e) Fifth Embodiment

When the telephone shifts to the standby state for the forwarding, the call transmission and the call reception except for the forwarding become impossible in the first to fourth embodiments. However, the call transmission and the forwarding may become possible by informing that the telephone is in the standby state for the forwarding, from the aspect of raising the degree of freedom of the use. Thus, it is possible to make contact with the partner required with priority when an urgent contact is required.

(f) Sixth Embodiment

Figure 13:
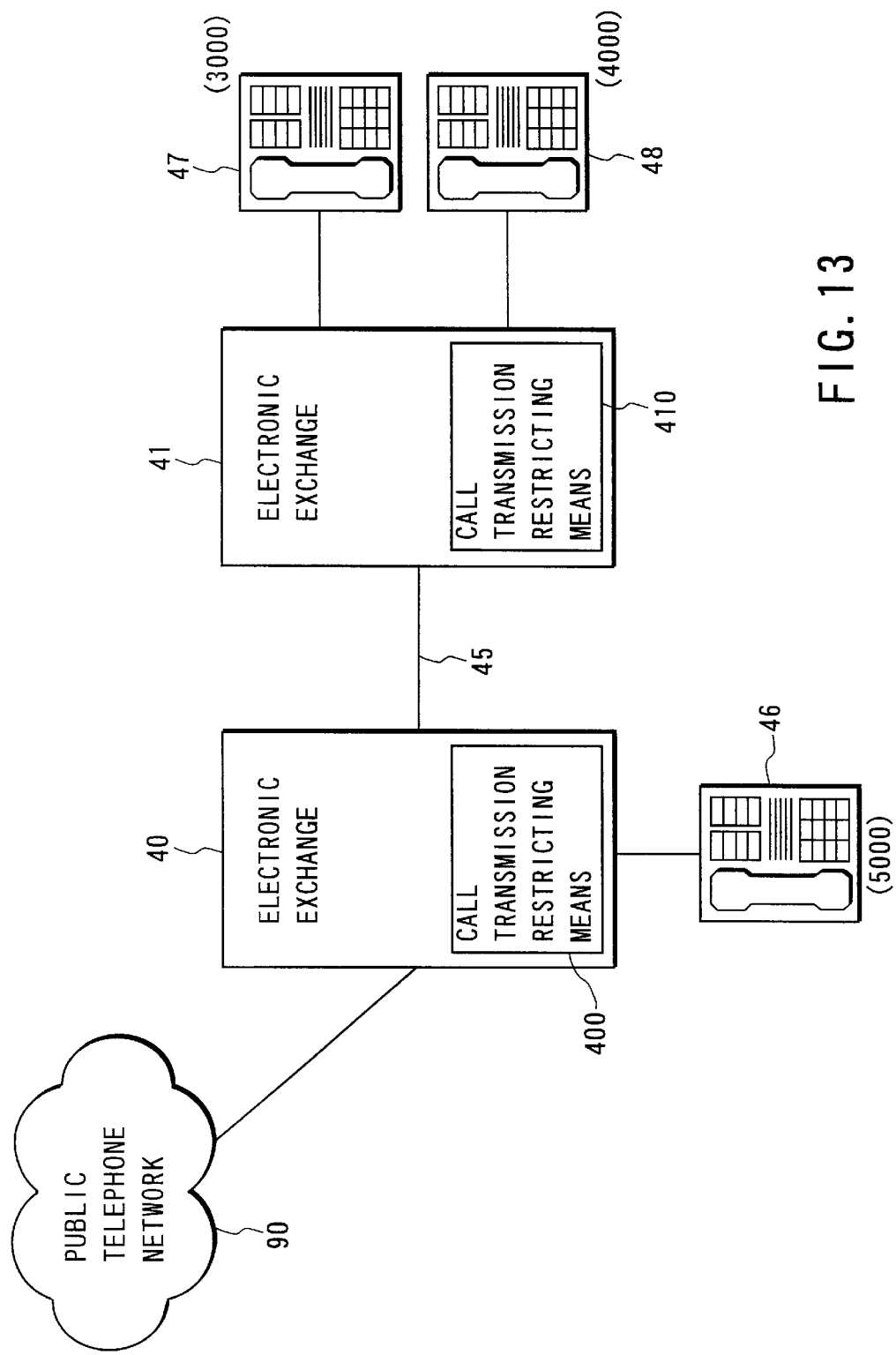
FIG. 13 is a block diagram showing an electronic exchange according to a sixth embodiment of the present invention.

FIG. 13 is a diagram showing the networking of electronic exchanges according to the sixth embodiment of the present invention.

In this figure, electronic exchanges 40 and 41 comprising call transmission restricting means 400 and 410 are connected to one another in a digital dedicated line 45 employing the QSIG protocol, which is the international standard for the digital dedicated lines. An extension telephone 46 is connected to the electronic exchange 40, and two extension telephones 47 and 48 are connected to the electronic exchange 41. The electronic exchange 40 is connected to a public telephone network 90.

It is assumed that extension telephone numbers 5000, 3000 and 4000 are assigned to the extension telephones 46, 47 and 48, respectively.

The characteristics of the electronic exchanges 40 and 41 in a case where a signal is transmitted from the extension telephone 47 through the digital line 45 to the public telephone network 90 will be explained.

Figure 14:
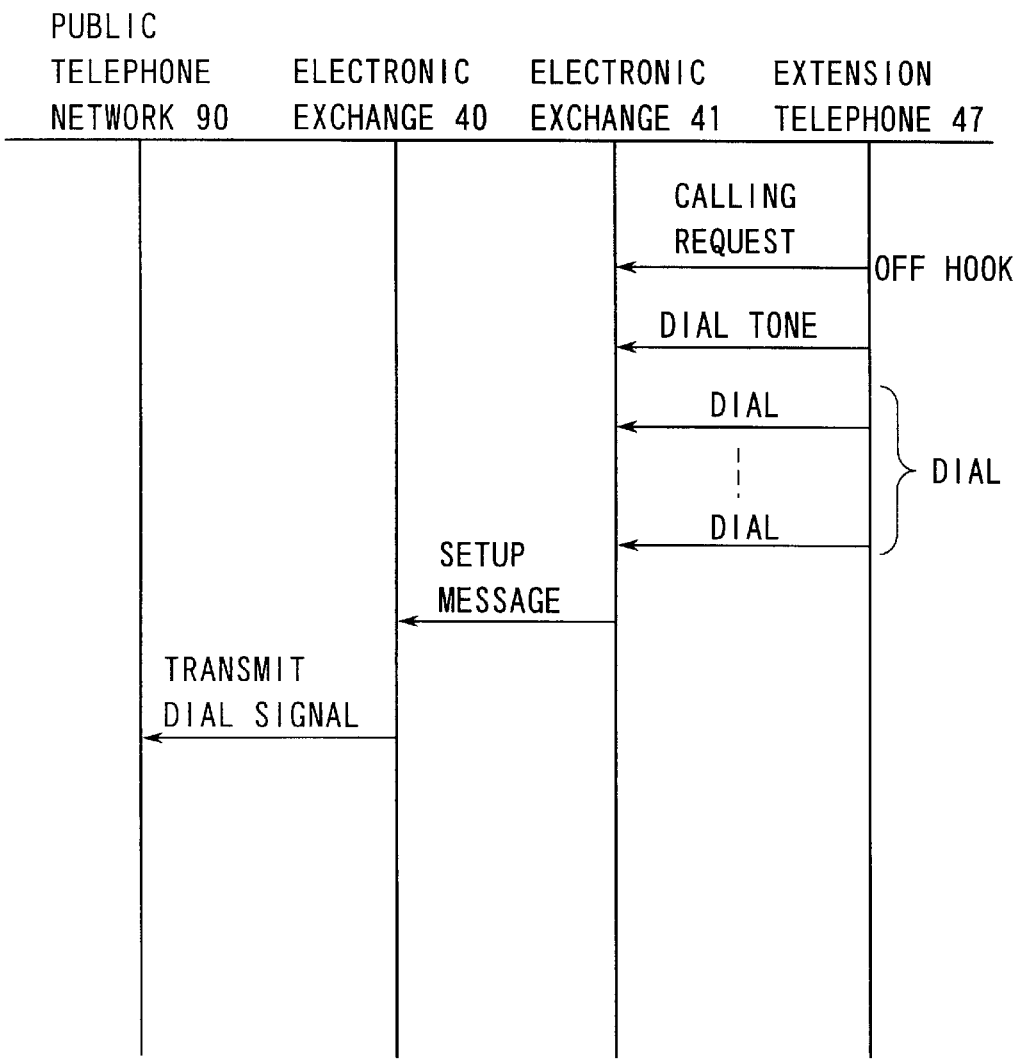
FIG. 14 is a diagram showing the transmitting conditions of a signal transmitted from the electronic exchange of the sixth embodiment.

FIG. 14 is a diagram showing the signal transmission conditions when the signals are transmitted from the extension telephone 47 to the public telephone network 90.

The user of the extension telephone 47 off-hooks the extension telephone 47 and transmits a request for call transmission to the electronic exchange 41. Thus, a dial tone signal is transmitted from the electronic exchange 41 to the extension telephone 47.

After confirming the dial tone, the user of the extension telephone 47 dials the telephone number of the communication partner. The dialing allows the electronic exchange 41 to transmit the calling request defined by the QSIG protocol, i.e. "Setup message" through the digital line 45 to the electronic exchange 40. When the electronic exchange 40 receives the calling request "Setup message", it transmits the dial information to the public telephone network 90.

Figure 15:
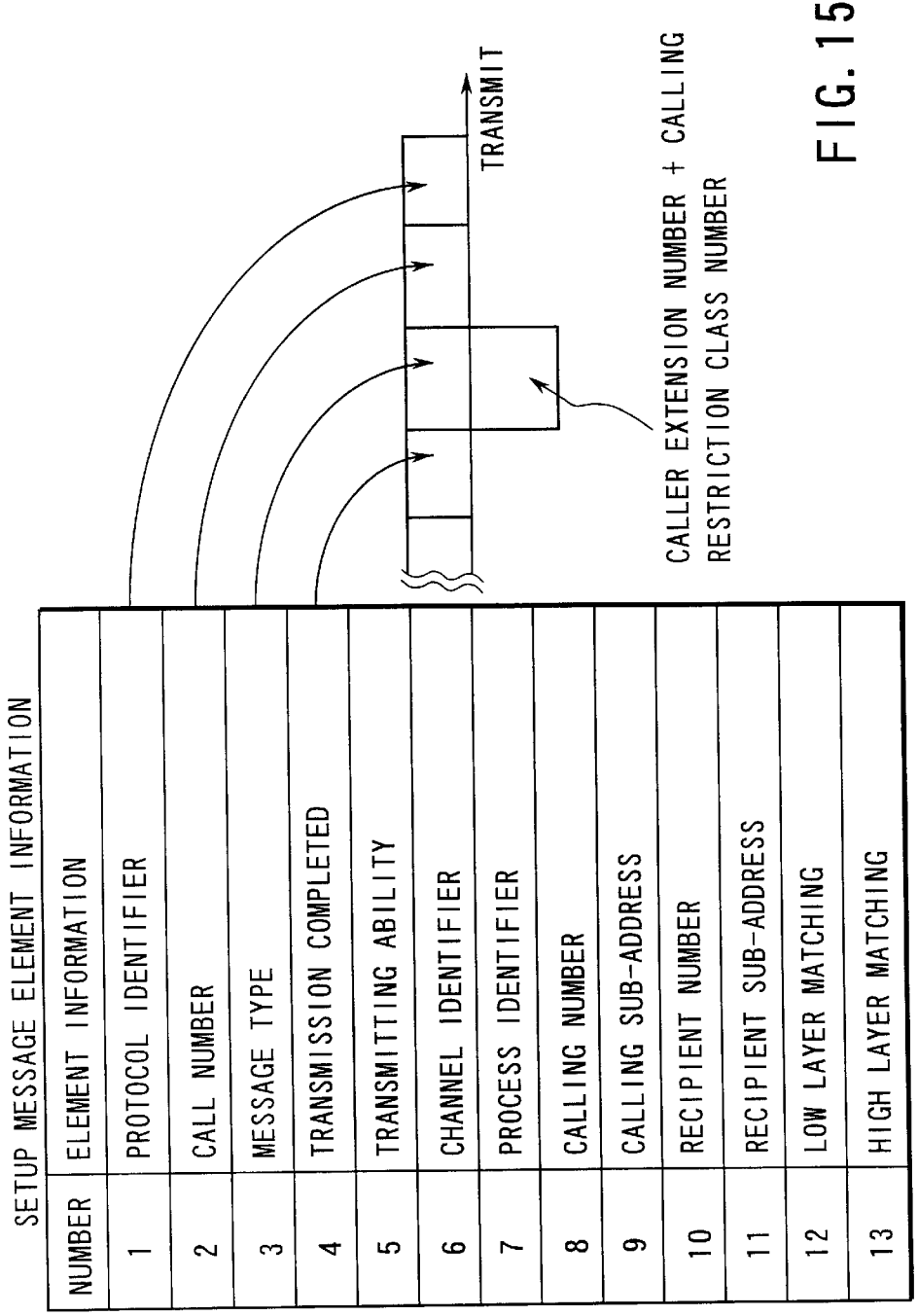
FIG. 15 is a diagram showing a structure of "Setup message" defined by the QSIG protocol.

FIG. 15 is a diagram showing the structure of the "Setup message" defined by the QSIG protocol. It is basically formed by information items denoted by numbers 1 to 4, and information items denoted by numbers 5 to 13 are added thereto as occasion requires.

The information items in the "Setup message" are sequentially transmitted to the opposed electronic exchange 40 when the "Setup message" is transmitted.

In the sixth embodiment, calling restriction class number (for example, a two-digit numeric) is added into caller number information (i.e. information informing the extension number of the calling telephone) of "MESSAGE TYPE" with item number 3 in the "Setup message", and the information is transmitted to the opposed electronic exchange 40. In this case, the calling restriction class number is set at "11".

FIG. 16 is a diagram showing the caller number information. The information necessary for the caller number information elements is input to octets 1 to 4, and the extension number of the caller who has actually made a call is input to a reserved item, i.e. octet 5. The caller telephone numbers or extension numbers to be input to reserved items are input to the respective octets as "3", "0", "0" and "0" as shown in the figure. Subsequently, a two-digit number "11" of the calling restriction class number is input as "1" and "1".

The total contents length of the caller number information can be freely set in the item "caller number contents length" of octet 2, so that the calling restriction class number can be easily added. Each octet is 1 byte long.

Figure 17:
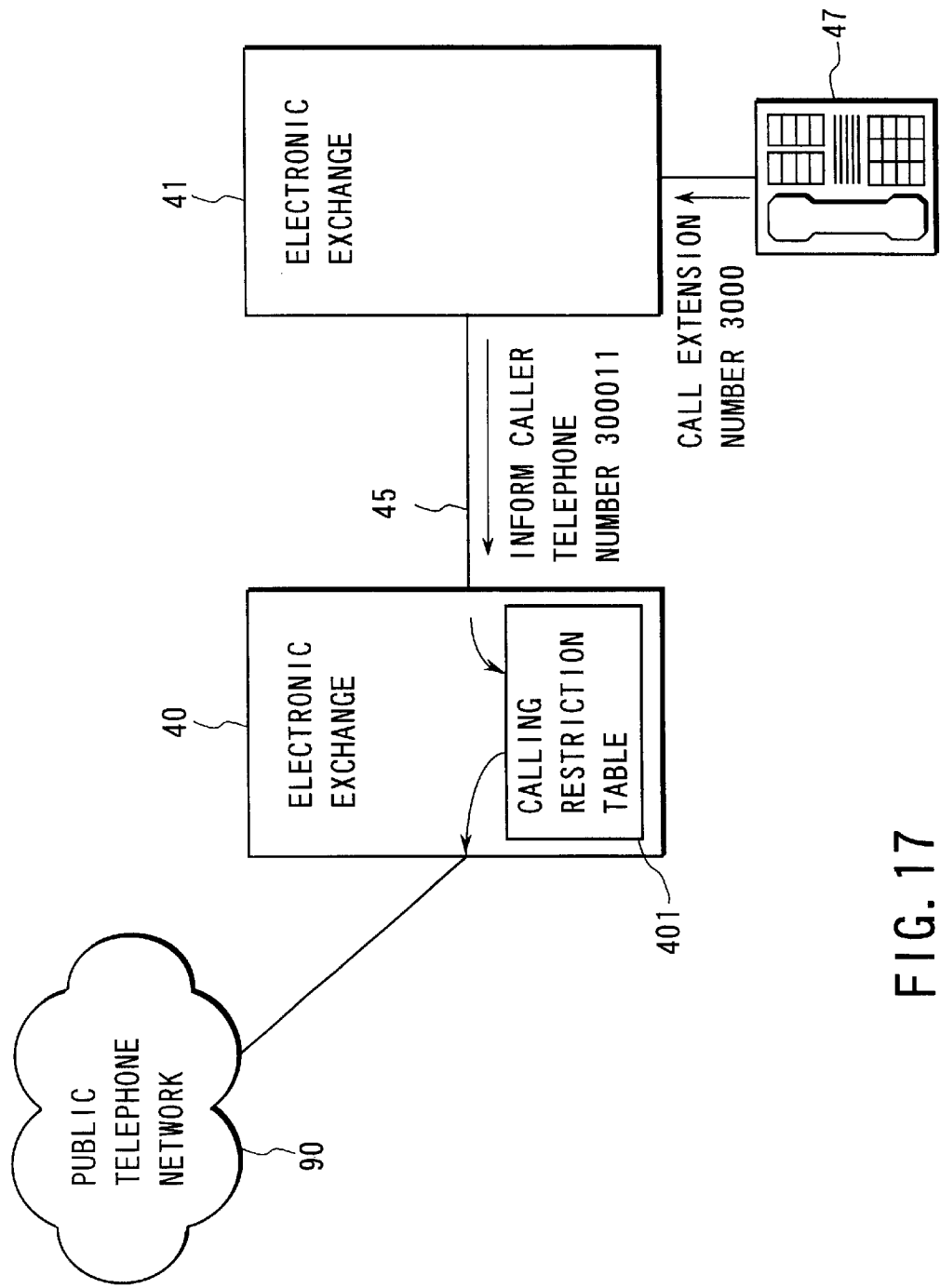
FIG. 17 is a block diagram showing the operation of the electronic exchange according to the sixth embodiment of the present invention.

As shown in FIG. 17, when the electronic exchange 41 receives a call from the extension telephone 47 of extension number "3000", the electronic exchange 41 add the calling restriction class number (i.e. a two-digit numeric, for example, "11") to the caller number information carrying the extension number of the extension telephone 47 and informs the opposed electronic exchange 40 of the information. The electronic exchange 40 detects calling restriction class number in the received caller number information, checks the calling restriction contents registered in advance on an own table 401 of the electronic exchange 40, and executes restriction such as disconnecting the calling as occasion requires.

For example, when it is set on the table 401 of the electronic exchange 40 not to accept an international telephone call of the extension telephone 47, the extension telephone 47 is not connected by the electronic exchange 40 even if there is an international telephone call from the extension telephone 47.

Thus, in the sixth embodiment, the calling restriction information is added to the caller number information of "Setup message" defined by the QSIG protocol, which is the international standard of the digital line, and is announced to the opposed electronic exchange 40. For this reason, execution of the specific coding caused by using information element unique to the manufacturer, or software for transmitting and receiving information element unique to the manufacturer is unnecessary. When these are unnecessary, the load on the CPU can be limited to the minimum.

(II) Key Telephone System
(g) Seventh Embodiment

Figure 5:
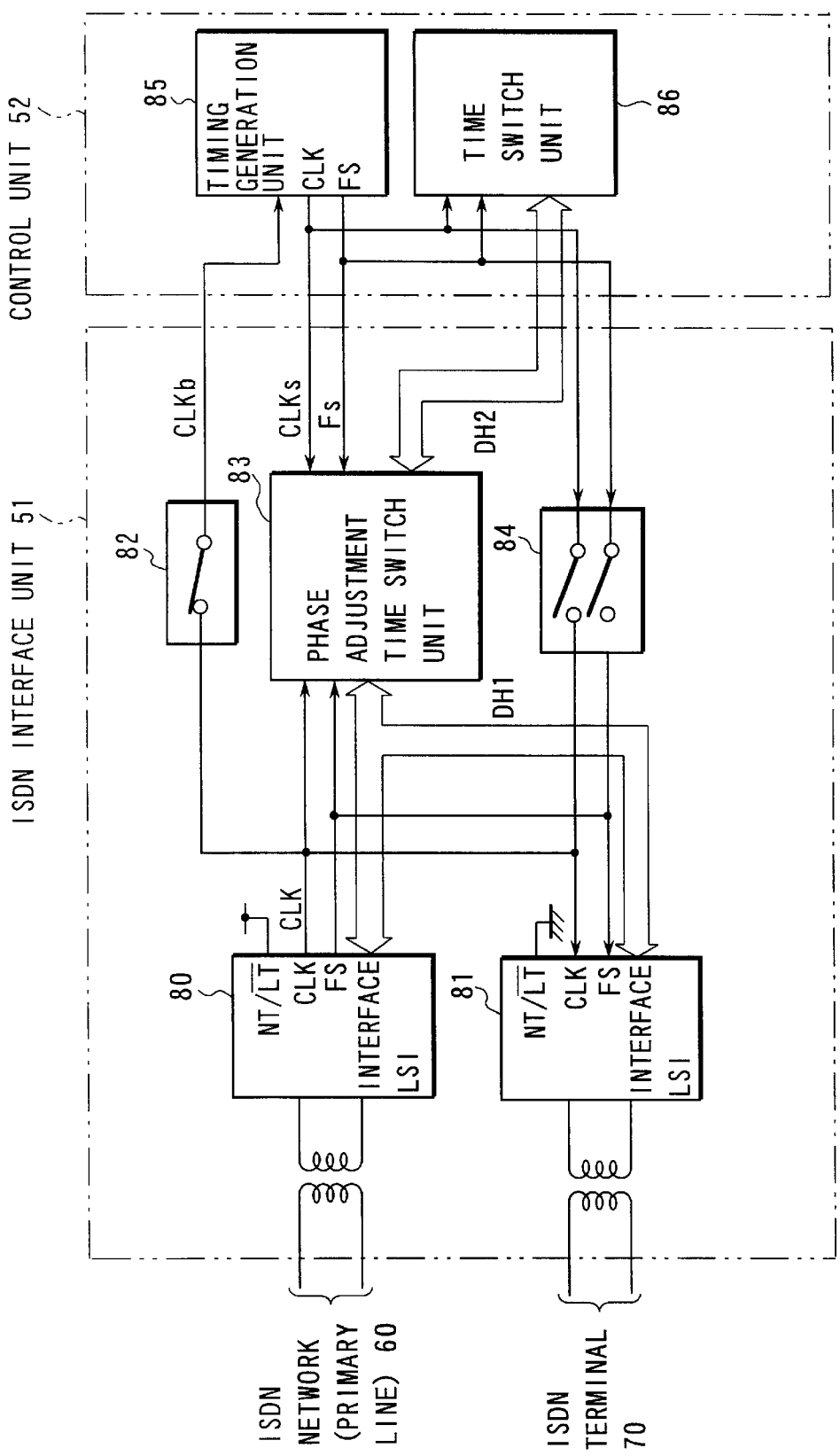
FIG. 5 is a block diagram showing configurations of an ISDN interface unit and a control unit in the conventional key telephone system of FIG. 4.
Figure 18:
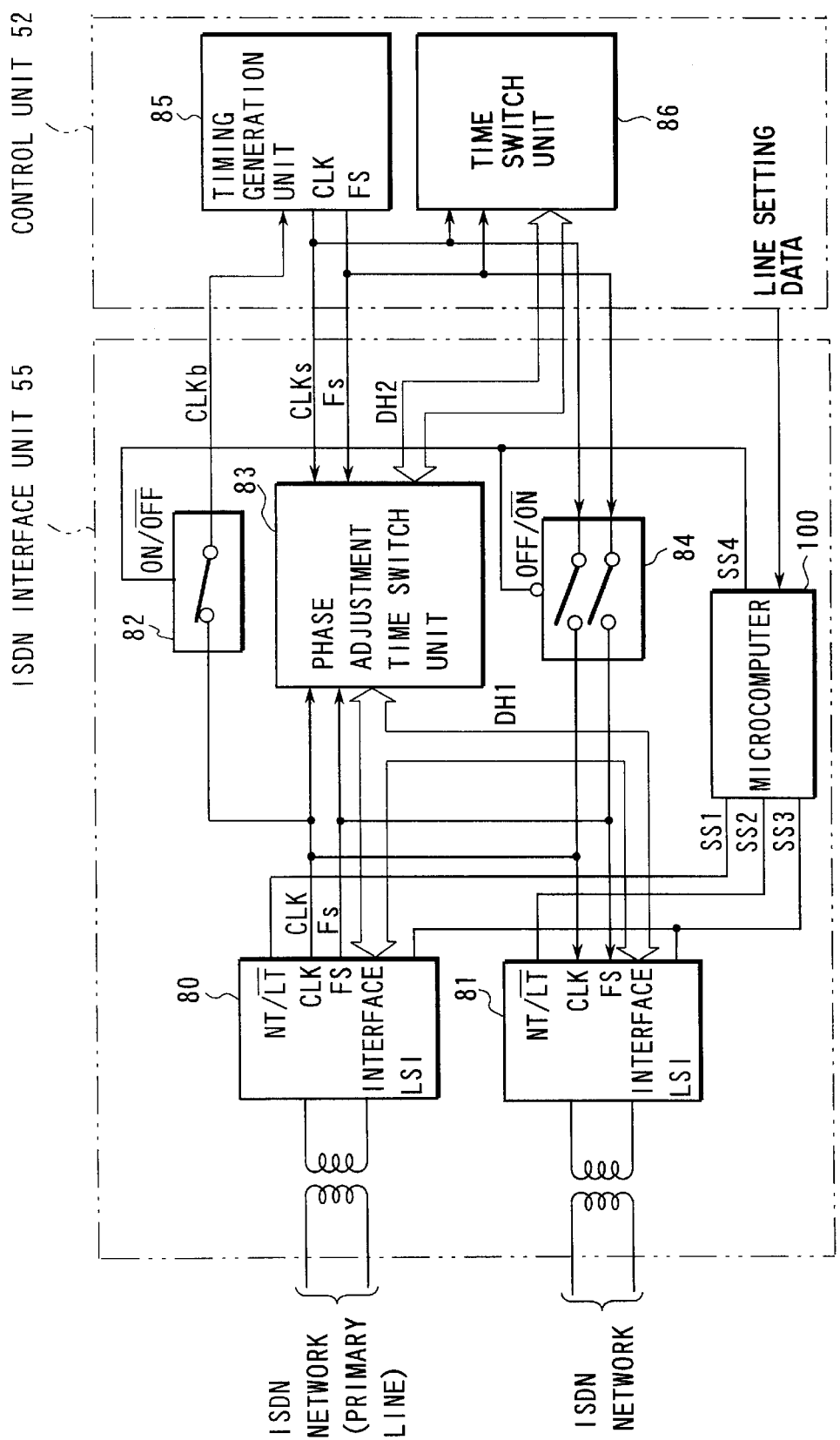
FIG. 18 is a block diagram showing configurations of an ISDN interface unit and a control unit in a key telephone system according to a seventh embodiment of the present invention.

FIG. 18 is a block diagram showing the configurations of an ISDN interface unit and a control unit in the key telephone system according to the seventh embodiment of the present invention. The same portions as those of FIG. 5 are denoted by the same reference numerals and their explanation is omitted.

An ISDN interface unit 55 of the present embodiment is adapted to U points (i.e. two pins) of the ISDN line.

Each of two interface LSIS 80 and 81 having the same function is fixed at the NT mode or LT mode in the conventional key telephone system. In the seventh embodiment, however, setting at the NT mode or LT mode can be freely executed by using a microcomputer 100.

In this case, a hardware setting control signal SS1 is used for the NT/LT setting port of the interface LSI 80 and a hardware setting control signal SS2 is used for the NT/LT setting port of the interface LSI 81, so that setting at the NT mode or LT mode can be executed by the microcomputer 100. A software setting control signal SS3, other than the control signals SS1 and SS2, is used for the interface LSIs 80 and 81 to inform the interface LSIs 80 and 81 that the hardware setting at the NT mode or LT mode has been made.

The microcomputer 100 sets both the interface LSIs 80 and 81 by the control signals SS1, SS2 and SS3, and controls turning on/off the switch units 82 and 84 by using a control signal SS4.

When the interface LSI 80 is set at the NT mode, the interface LSI 80 extracts the clock signal CLK from the ISDN network 60. When the interface LSI 80 is set at the LT mode, the interface LSI 80 does not extract the clock signal. When the interface LSI 80 is set at the NT mode and the interface LSI 81 is set at the LT mode, the interface LSI 80 extracts the clock signal CLK from the ISDN network 60 and supplies the signal to the interface LSI 81. At this time, the switch unit 82 is controlled to be turned on and the switch unit 84 is controlled to be turned off.

The basic clock signal CLKb extracted from the ISDN network 60 by the interface LSI 80 is input to the timing generation unit 85 in the control unit 52 through the switch unit 82. The timing generation unit 85 generates the clock signal CLKs for the system synchronization signal and the frame synchronization signal FS in accordance with the basic clock signal CLKb and transmits these signals to the time switch unit 86 in the control unit 52 and the phase adjustment time switch unit 83 in the ISDN interface unit 55 so as to synchronize with the ISDN network.

The interface LSIs 80 and 81 are synchronized with the phase adjustment time switch unit 83 by the clock signal CLK of the interface LSI 80 and the frame synchronization signal FS.

On the other hand, the speech data from the interface LSIs 80 and 81 is transmitted to the phase adjustment time switch unit 83 through the data highway DH1. The speech data is further transmitted to the time switch unit 86 through the data highway DH2 synchronized with the time switch unit 86 in the control unit 52. Thus, the speech data can be handled as a system-synchronized signal.

Figure 19:
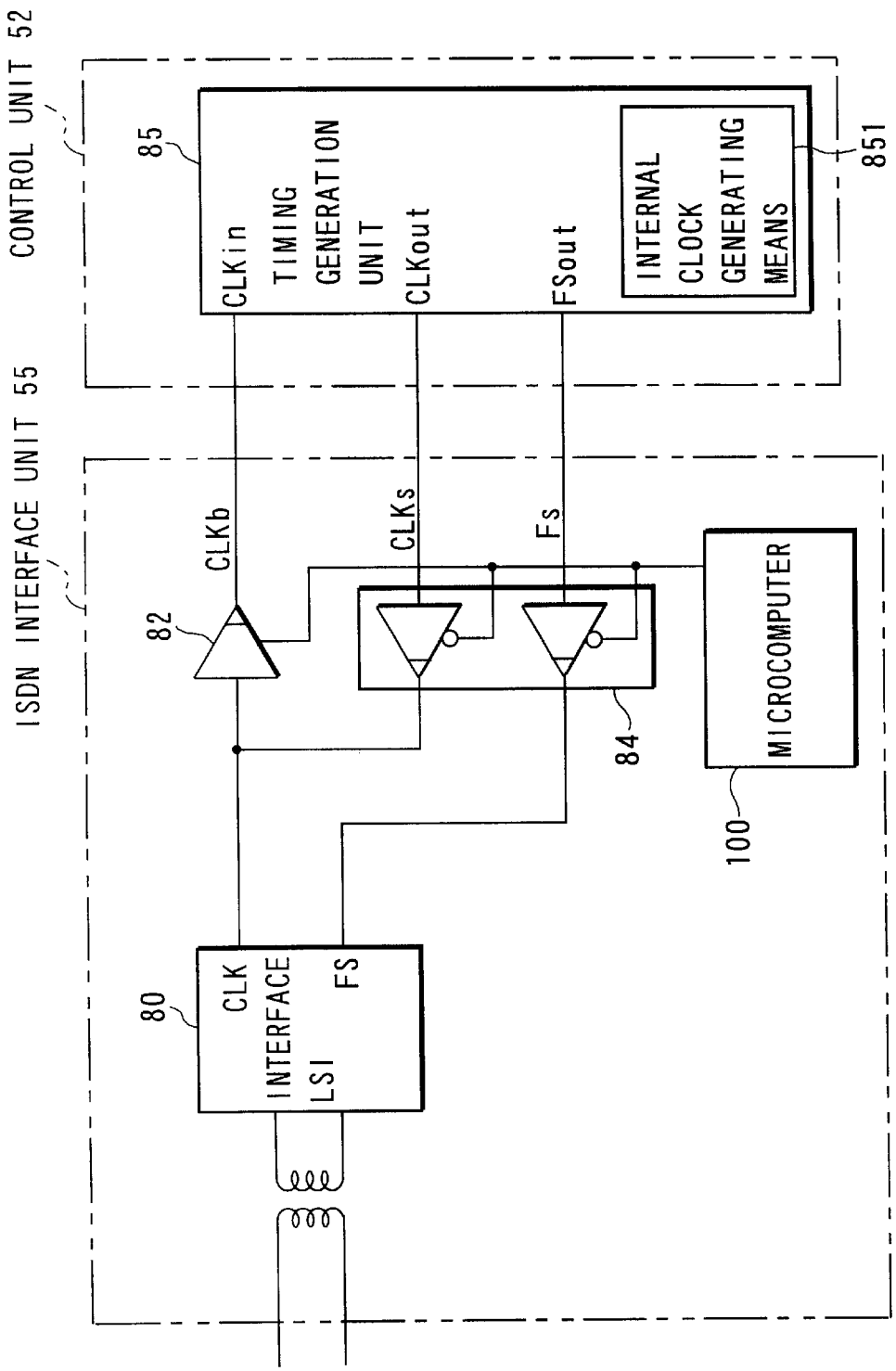
FIG. 19 is a block diagram showing a part in each of the configurations of the ISDN interface unit and the control unit in the key telephone system according to the seventh embodiment of the present invention.

FIG. 19 is a diagram showing a specific example of using a three-state buffer at the switch units 82 and 84.

The switch unit 82 is turned on and the switch unit 84 is turned off by using the control signal SS4 of the microcomputer 100 so that the interface LSI 80 in the ISDN interface unit 55 extracts the clock signal CLK from the ISDN network 60. To make the system synchronized by this clock signal CLK.

The timing generation unit 85 in the control unit 52 generates the system clock signal CLKs and the frame synchronization signal FS in accordance with the basic clock signal CLKb from the switch unit 82 as described above.

When the interface LSI 80 does not extract the clock signal CLK from the ISDN network 60, the switch unit 82 is turned off and the switch unit 84 is turned on and internal clock generating means 851 in the timing generation unit 85 is used. The timing generation unit 85 in the control unit 52 generates the system clock signal CLKs and the frame synchronization signal FS in accordance with the clock signal generated by the internal clock generating means 851.

Thus, the clock can be easily switched by using the three-state buffer for the switch units 82 and 84.

Figure 20:
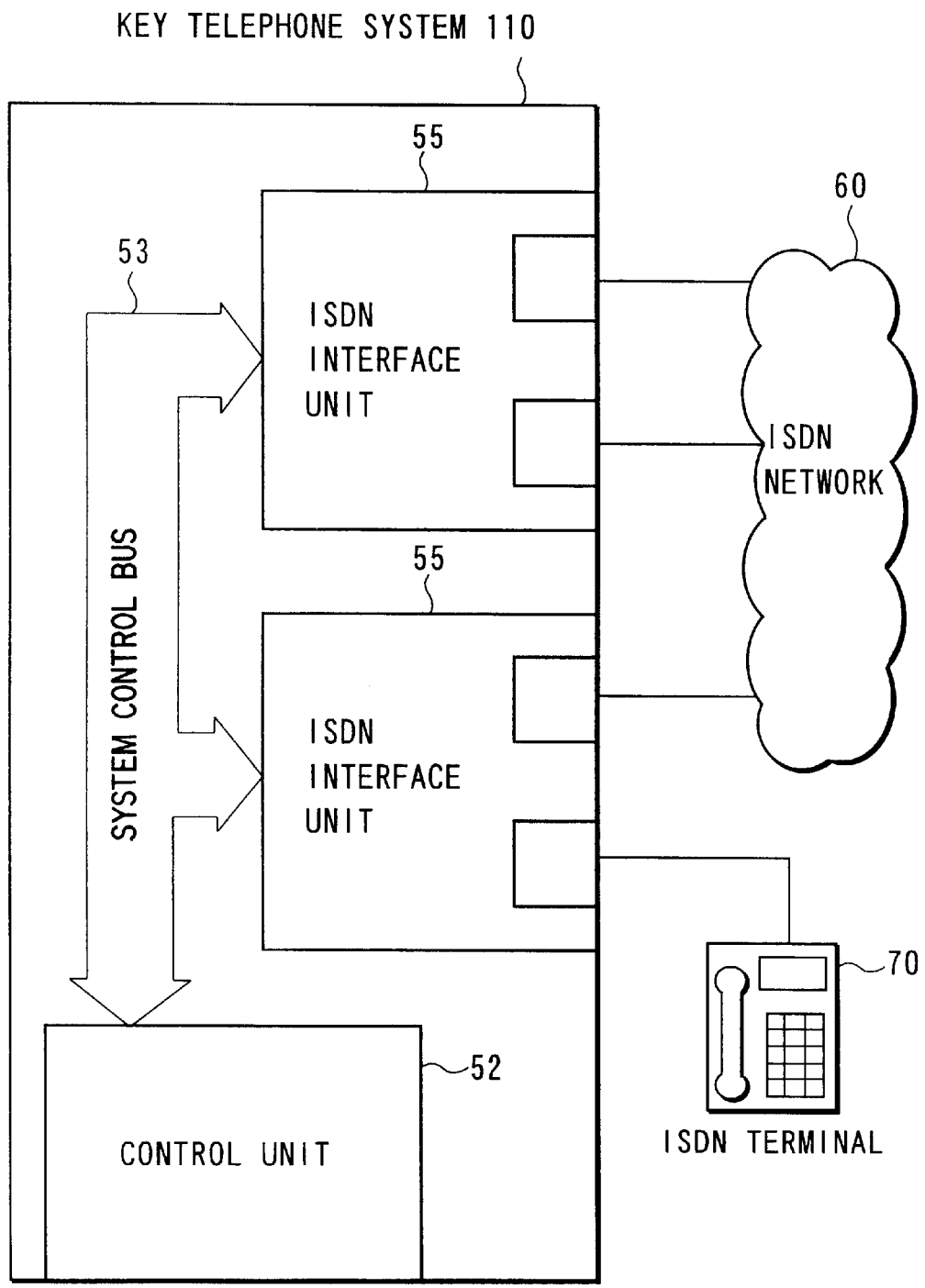
FIG. 20 is a block diagram showing an application example of the key telephone system of the seventh embodiment.

FIG. 20 shows an example of a key telephone system 110 having three NT ports and one LT port. That is, three NT ports and one LT port are formed by two ISDN interface units 55 in a key telephone system 110.

The ISDN interface unit 55 can freely set the NT/LT modes as described above, and large convenience can be thereby provided to the user.

To provide three NT ports and one LT port, three ISDN interface units 51 need to be prepared in the prior art, and two of the LT ports are unnecessary. In the present invention, the NT mode or the LT mode can be freely set by one ISDN interface unit 55. Therefore, the system can be rationally constituted and much advantage can be obtained in the manufacturing costs.

Thus, in the seventh embodiment, the LT/NT modes of the interface LSIs 80 and 81 are set by the microcomputer 100, at the U points of the ISDN line. When both the interface LSIs 80 and 81 are set at the NT mode, the switch unit 82 is turned off and the switch unit 84 is turned on by the microcomputer 100 to use the clock signal generated by the internal clock generating means 851 in the timing generation unit 85. The microcomputer 100 sets the LT/NT modes of the interface LSIS 80 and 81 in accordance with the line setting data that is input from the control unit 52.

Therefore, since one interface unit 55 can be freely set at either the NT mode or the LT mode, it is possible to provide the key telephone system with high degree of freedom where the number of ISDN line ports and the number of extension ports can be increased or decreased in accordance with the purpose.

(h) Eighth Embodiment

Figure 6:
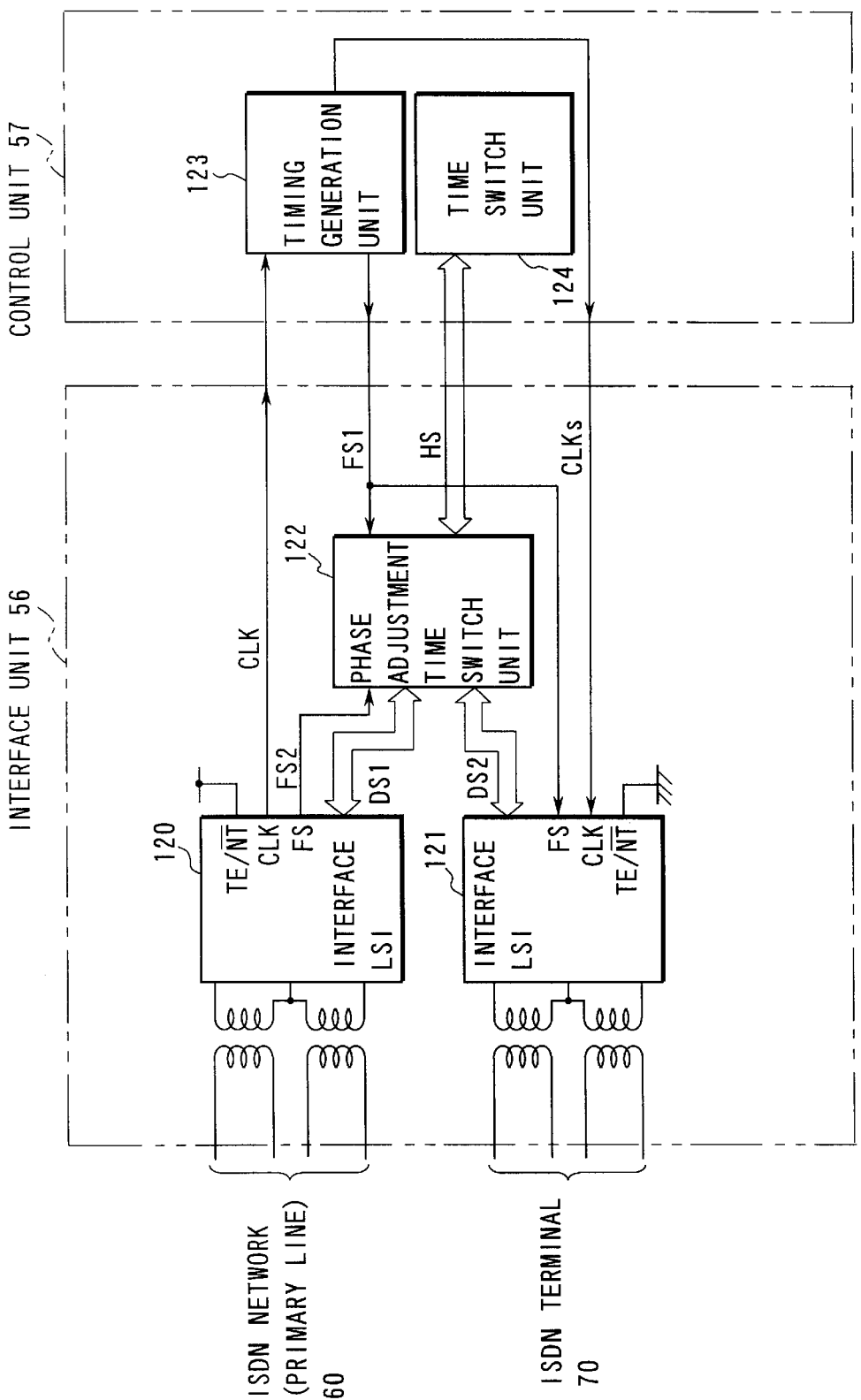
FIG. 6 is a block diagram showing configurations of an ISDN interface unit and a control unit in another conventional key telephone system.
Figure 21:
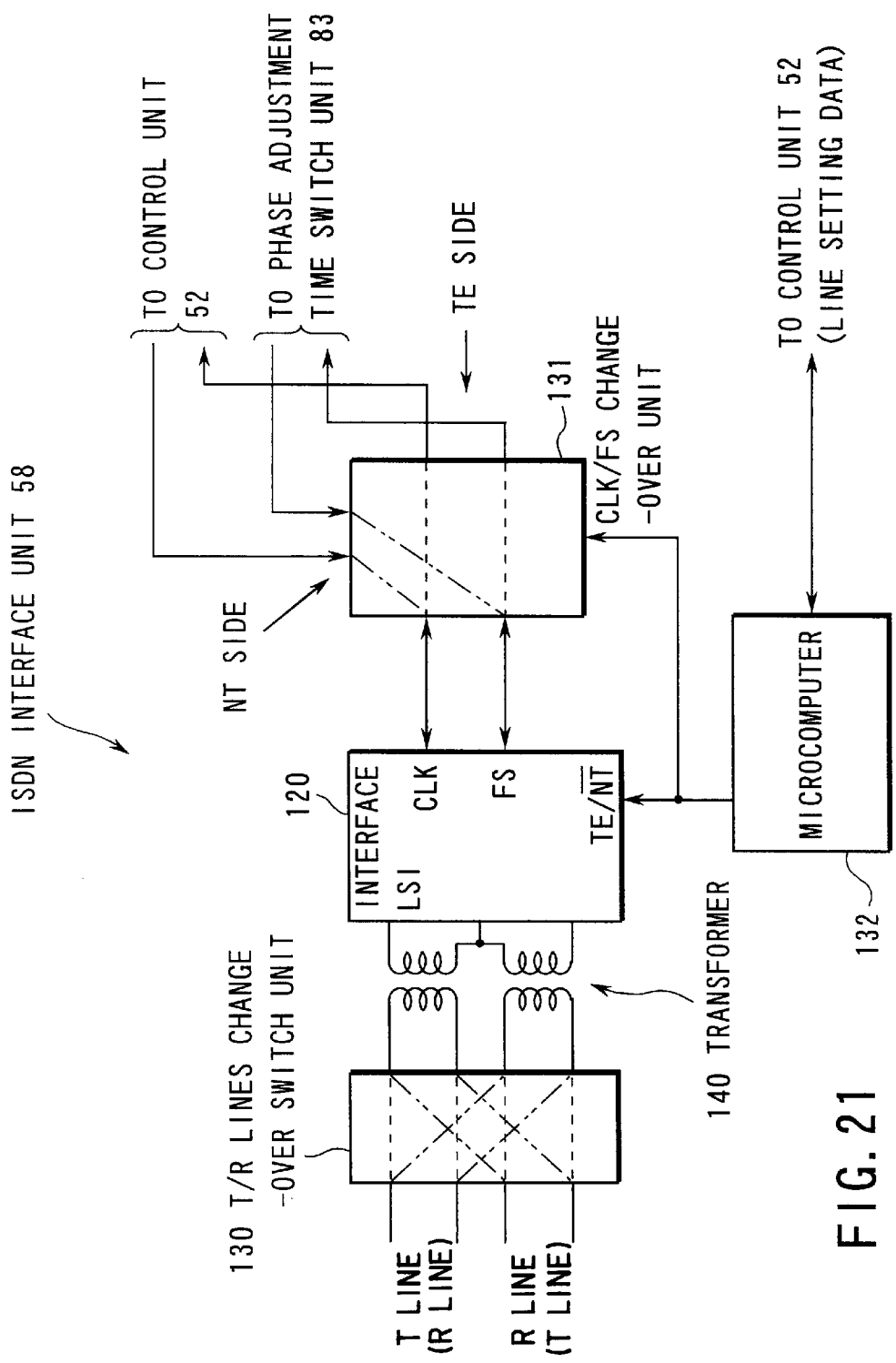
FIG. 21 is a block diagram showing a part in each of the configurations of the ISDN interface unit in a key telephone system according to an eighth embodiment of the present invention.

FIG. 21 is a block diagram showing the essential portions of an ISDN interface unit 58 in the key telephone system according to the eighth embodiment of the present invention. The same portions as those of FIG. 6 are denoted by the same reference numerals, and their explanations are omitted. The control unit and portion other than the ISDN interface unit 58 shown in FIG. 21 are the same as the ISDN interface unit 55 and the control unit 52 of FIG. 18.

The eighth embodiment is adapted to S and T points (i.e. four pins) of the ISDN line, and two interface LSIs 120 and 121 that have been required in the prior art are reduced to one. To implement this, a T/R lines change-over switch unit 130 for changing a transmission line (i.e. a T line) and a reception line (i.e. R line) at the NT and TE modes and a CLK/FS change-over unit 131 for changing the clock signal and the frame synchronization signal are added to the conventional configuration.

Further, a control line from a microcomputer 132 for the changing of the NT/TE modes in the CLK/FS change-over unit 131 and the interface LSI 120 is also added.

Figure 22:
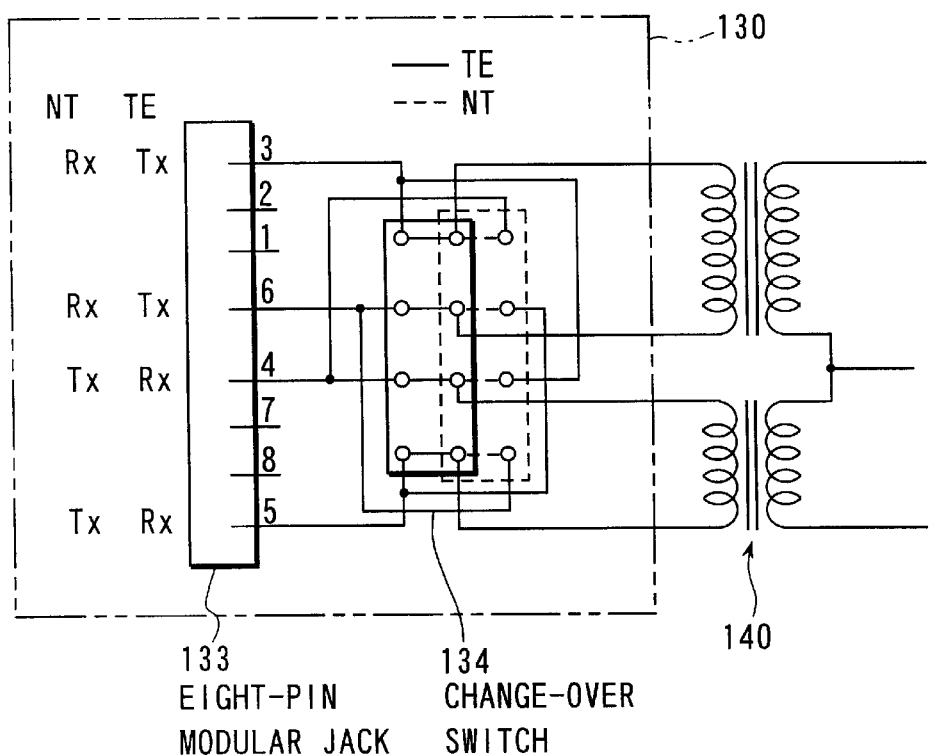
FIG. 22 is a diagram showing a detailed configuration of a T/R line switching unit in the key telephone system of the eighth embodiment.

FIG. 22 is a diagram showing a detailed configuraltion of the T/R lines change-over switch unit 130.

The interface with the line is an eight-pin modular jack 133 usually called RJ45. The "third and sixth pins" are used for transmission and the "fourth and fifth pins" are used for reception at the TE mode. The "fourth and fifth pins" are used for transmission and the "third and sixth pins" are used for reception at the NT mode. These are mechanically changed by a manual switch of a change-over switch 134. An electric switch such as a relay, a semiconductor switch, etc. can be used if the primary and secondary insulation can be maintained by a transformer 140.

As shown in FIG. 21, the control unit 52 (in FIG. 18) transmits the setting contents of the line to the microcomputer 132 through the internal bus. The microcomputer 132 instructs the interface LSI 120 and the CLK/FS change-over unit 131 to set the TE/NT modes in accordance with the setting contents of the line transmitted from the control unit 52.

A clock signal CLK and a frame synchronization signal FS are extracted from the ISDN network 60 at the TE mode. Therefore, the signals flow from the interface LSI 120 to the control unit 52 and also to the phase adjustment time switch unit 83 (FIG. 18) in the ISDN interface unit 58. The entire system is operated in accordance with the clock signal CLK.

On the other hand, at the NT mode, circuit becomes in the slave-synchronizing state and the signals therefore flow from the control unit 52 and the phase adjustment time switch unit 83 in the ISDN interface unit 58 to the interface LSI 120.

Figure 23:
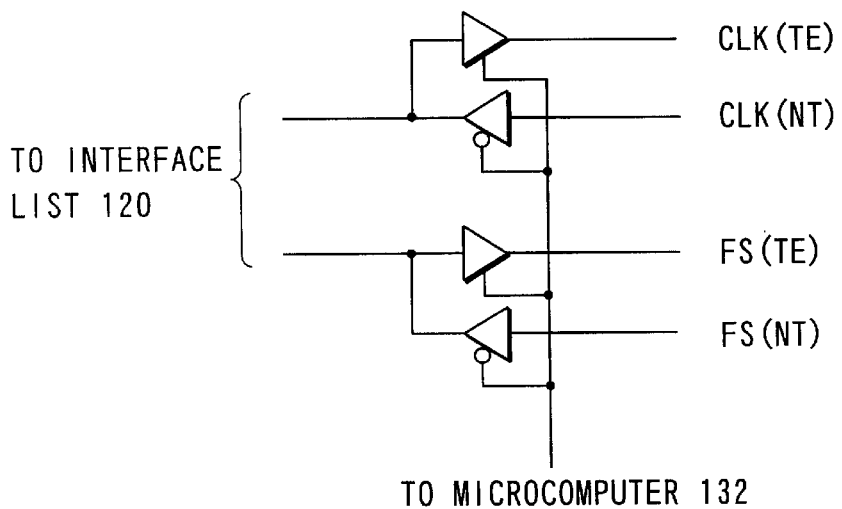
FIG. 23 is a diagram showing a detailed configuration of a CLK/FS switching unit in the key telephone system of the eighth embodiment.

FIG. 23 is a diagram showing a detailed configuration of the CLK/FS change unit 131. This can be easily implemented by a three-state buffer as shown in the figure.

As described above, in the eighth embodiment, the T/R lines change-over switch unit 130 for reversing the T line and the R line is provided at the front stage of the interface LSI 120, at the S and T points of the ISDN line, so as to change the T line and the R line. In addition, the microcomputer 132 is provided to set the TE/NT modes of the interface LSI 120 and control the CLK/FS change unit 131. When the T/R lines change-over switch unit 130 is changed to the TE side, the line setting data to set the TE is input to the microcomputer 132. On the other hand, the T/R lines change-over switch unit 130 is changed to the NT side, the line setting data to set the NT is input to the microcomputer 132. Inputting the line setting data to set the TE, the microcomputer 132 sets the interface LSI 120 at the TE mode and also sets the CLK/FS change unit 131 at the TE side. The microcomputer 132, which is input the line setting data to set the NT mode, sets the interface LSI 120 at the NT mode and also sets the CLK/FS change unit 131 at the NT side. Thus, one ISDN interface unit 58 can be freely set at either the TE side or the NT side and, therefore, the degree of freedom for the selection of the line is made higher. If a number of such ISDN interface units 58 are used, the degree of freedom for the selection of the line is made much higher and thereby a user-friendly key telephone system can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic exchange capable of controlling call reception from and call transmission to other electronic exchanges, comprising:

means for receiving a requbst for a forwarding from the other electronic exchanges; and prohibiting means for setting a telephone of forwarding destination connected to the own electronic exchange to be in a state of prohibiting the call reception except for the forwarding or the call transmission at the time to make said telephone shift to a standby state for the forwarding in response to said request for the forwarding.

2. An electronic exchange according to claim 1, wherein said electronic exchange being capable of controlling the call reception from and call transmission to the other electronic exchanges under the QSIG protocol.

3. An electronic exchange according to claim 1, wherein said electronic exchange makes said telephone of the forwarding destination connected to the own electronic exchange to shift to be in the standby state for the forwarding when said telephone is idle.

4. An electronic exchange according to claim 1, further comprising announcement setting means for setting said telephone so as to announce to a user of said telephone that said telephone is set in said prohibition state.

5. An electronic exchange according to claim 4, wherein said announcement setting means sets said telephone so as to operate a sound source provided in said telephone.

6. An electronic exchange according to claim 4, wherein said announcement setting means sets said telephone so as to display predetermined information on a display unit provided on said telephone.

7. An electronic exchange according to claim 4, wherein said announcement setting means sets said telephone so as to turn on a light of a display unit provided on said telephone.

8. An electronic exchange according to claim 4, wherein said announcement setting means sets said telephone so as to operate a sound source provided in said telephone when a calling key of said telephone is pushed down in a period from the time of shifting to said standby state for the forwarding to the time of receiving an incoming call caused by the forwarding.

9. An electronic exchange according to claim 4, wherein said announcement setting means sets said telephone so as to display predetermined information on a display unit provided on said telephone when a calling key of said telephone is pushed down in the period from the time of shifting to said standby state for the forwarding to the time of receiving an incoming call caused by the forwarding.

10. An electronic exchange according to claim 4, wherein said announcement setting means sets said telephone so as to turn on a light of a display unit provided on said telephone when a calling key of said telephone is pushed down in the period from the time of shifting to said standby state for the forwarding to the time of receiving an incoming call caused by the forwarding.

11. An electronic exchange according to claim 4, wherein said announcement setting means sets said telephone so as not to accept input made by a dial key when a calling key of said telephone is pushed down in the period from the time of shifting to said standby state for the forwarding to the time of receiving an incoming call caused by the forwarding.

12. An electronic exchange capable of controlling call reception from and call transmission to other electronic exchanges, comprising:

means for receiving a request for a forwarding from the other electronic exchanges; and announcement setting means for setting a telephone of forwarding destination connected to the own electronic exchange to announce to a user of said telephone that said telephone is set in a standby state for the forwarding at the time to make said telephone shift to said standby state for the forwarding in response to said request for the forwarding.

13. An electronic exchange according to claim 12, wherein said electronic exchange makes said telephone of the forwarding destination connected to the own electronic exchange to shift to be in the standby state for the forwarding.

14. An electronic exchange according to claim 12, wherein said electronic exchange makes said telephone of the forwarding destination connected to the own electronic exchange to shift to be in the standby state for the forwarding when said telephone is idle.

15. An electronic exchange according to claim 12, wherein said announcement setting means sets said telephone so as to operate a sound source provided in said telephone.

16. An electronic exchange according to claim 12, wherein said announcement setting means sets said telephone so as to display predetermined information on a display unit provided on said telephone.

17. An electronic exchange according to claim 12, wherein said announcement setting means sets said telephone so as to turn on a light of a display unit provided on said telephone.

18. An electronic exchange according to claim 12, wherein said announcement setting means sets said telephone so as to operate a sound source provided in said telephone when a calling key of said telephone is pushed down in a period from the time of shifting to said standby state for the forwarding to the time of receiving an incoming call caused by the forwarding.

19. An electronic exchange according to claim 12, wherein said announcement setting means sets said telephone so as to display predetermined information on a display unit provided on said telephone when a calling key of said telephone is pushed down in the period from the time of shifting to said standby state for the forwarding to the time of receiving an incoming call caused by the forwarding.

20. An electronic exchange according to claim 12, wherein said announcement setting means sets said telephone so as to turn on a light of a display unit provided on said telephone when a calling key of said telephone is pushed down in the period from the time of shifting to said standby state for the forwarding to the time of receiving an incoming call caused by the forwarding.

21. An electronic exchange according to claim 12, wherein said announcement setting means sets said telephone so as not to accept input made by a dial key when a calling key of said telephone is pushed down in the period from the time of shifting to said standby state for the forwarding to the time of receiving an incoming call caused by the forwarding.

* * * * *

UNITED STATES PATENT AND TRADEMARK OFFICE
CERTIFICATE OF CORRECTION

PATENT NO. : 6,687,361 B1
DATED : February 3, 2004
INVENTOR(S) : Wakabayashi et al.

It is certified that error appears in the above-identified patent and that said Letters Patent is hereby corrected as shown below:

Column 16,
Line 35, change "requbst" to -- request --.

Signed and Sealed this

Thirteenth Day of April, 2004

JON W. DUDAS
*Acting Director of the United States Patent and Trademark Office*